US012548005B2

(12) United States Patent
Church

(10) Patent No.: US 12,548,005 B2
(45) Date of Patent: Feb. 10, 2026

(54) COMPUTER SYSTEM, METHOD, AND DEVICE FOR TRANSFERRING VALUE WITH OFFLINE FUNCTIONALITY

(71) Applicant: 10353744 Canada Ltd., Kitchener (CA)

(72) Inventor: Mark Church, Waterloo (CA)

(73) Assignee: Elpis Technologies Inc., Kitchener (CA)

( * ) Notice: Subject to any disclaimer, the term of this patent is extended or adjusted under 35 U.S.C. 154(b) by 161 days.

(21) Appl. No.: 18/529,517

(22) Filed: Dec. 5, 2023

(65) Prior Publication Data

US 2024/0185214 A1 Jun. 6, 2024

Related U.S. Application Data

(60) Provisional application No. 63/430,341, filed on Dec. 5, 2022.

(51) Int. Cl.
*G06Q 20/10* (2012.01)
*G06Q 20/22* (2012.01)
(Continued)

(52) U.S. Cl.
CPC ....... *G06Q 20/322* (2013.01); *G06Q 20/3827* (2013.01); *G06Q 20/40145* (2013.01); *G06Q 20/4015* (2020.05)

(58) Field of Classification Search
CPC ............. G06Q 20/322; G06Q 20/3827; G06Q 20/40145; G06Q 20/4015; G06Q 20/341;
(Continued)

(56) References Cited

U.S. PATENT DOCUMENTS

2004/0230535 A1* 11/2004 Binder .................. G06Q 20/24
705/64
2010/0169212 A1 7/2010 Paintin
(Continued)

FOREIGN PATENT DOCUMENTS

CN 112184239 A 1/2021

OTHER PUBLICATIONS

Canadian Intellectual Property Office, Office Action for CA Patent App. No. 3222069, Jun. 13, 2024.

*Primary Examiner* — Clifford B Madamba
(74) *Attorney, Agent, or Firm* — Own Innovation; James W. Hinton

(57) ABSTRACT

A system and method for transferring value across user devices is provided. The system includes sending and receiving user devices. The sending and receiving user devices are configured to store value locally on the respective device. The receiving user device is configured to receive a transfer amount sent by the sending user device. The system also includes a transfer server. If the sending user device stores value at least equal to the transfer amount, the transfer server freezes an amount of value at least equal to the transfer amount. The sending user device transfers the transfer amount to the receiving user device as frozen funds to be unfrozen upon receiving confirmation from the user of the sending user device and acceptance from the receiving user device. The transfer occurs only if the sending and receiving user devices are in close physical proximity upon or shortly after the transfer request.

20 Claims, 15 Drawing Sheets

(51) Int. Cl.
*G06Q 20/32* (2012.01)
*G06Q 20/34* (2012.01)
*G06Q 20/38* (2012.01)
*G06Q 20/40* (2012.01)

(58) Field of Classification Search
CPC ............ G06Q 20/353; G06Q 20/3552; G06Q 20/3563; G06Q 20/223; G06Q 20/10; G06Q 20/357; G06Q 20/381
USPC ........................................................... 705/39
See application file for complete search history.

(56) References Cited

U.S. PATENT DOCUMENTS

| | | | |
|---|---|---|---|
| 2012/0078789 A1* | 3/2012 | Harrell | G06Q 20/40 |
| | | | 705/44 |
| 2015/0339664 A1* | 11/2015 | Wong | H04L 63/0823 |
| | | | 705/71 |
| 2018/0330346 A1* | 11/2018 | Grassadonia | G06Q 20/3278 |
| 2019/0130386 A1* | 5/2019 | Bhat | G06Q 20/367 |

\* cited by examiner

COMPUTER SYSTEM, METHOD, AND DEVICE FOR TRANSFERRING VALUE WITH OFFLINE FUNCTIONALITY

TECHNICAL FIELD

The following relates generally to electronic value transfers between devices, and more particularly to systems and methods for transfers of value where one or both parties to the transfer is offline.

INTRODUCTION

Physical cards, digital wallets, and the like do not actually serve as a replacement for cash money. Such cards and wallets do not store value thereon. Throughout the present disclosure, 'value' and particularly 'digital value' is to be understood as including traditional money in digital form (e.g., CAD) and points or other reward systems provided by businesses (e.g., digital tokens or points for the use of golf course amenities). Instead, such cards and wallets are merely representative of the user's financial value, which is stored separately, for example in a bank account against which a debit card is configured to draw. A result of the fact that such cards and wallets merely reference value stored elsewhere without containing that value in the respective card or wallet is the requirement that such devices maintain online connectivity in order to work. It is not technically and technologically possible for such physical cards and digital wallets to function in the absence of Internet connections. As a result, transactions using such physical cards, digital wallets, and the like rely heavily on network connections.

Accordingly, there is a need for an improved computer system and method with offline functionality for devices for electronic transfer of value that overcomes at least some of the disadvantages of existing systems and methods.

SUMMARY

The present disclosure provides systems, methods, and devices for storing digital value locally on a user device. Provided are a system and method based on using two user devices to effect a transfer of funds (hereinafter referred to as a 'funds transfer') across the devices, even while one device is offline or both devices are offline. Such funds transfer is also possible while both devices are online. If such funds transfer takes place while one or both devices is offline, the funds balances of each offline device will be reconciled with a user funds balance once the one or both devices that were offline at the time of the transfer regain online connectivity. This approach may advantageously prevent double spending of funds by a user. A corollary of the prevention of double spending is that such value is meaningfully transferred to a user device and does not reside elsewhere, such as on a server. Where such value resides elsewhere, if the user device is lost, the user value may be similarly lost.

A system for transferring value across user devices is provided. The system includes at least one sending user device, the sending user device configured to store monetary value, at least one receiving user device, the receiving user device configured to receive a transfer amount of value sent by the sending user device, a transfer server that, when the sending user device stores value greater than or equal to the transfer amount of value, freezes at the sending user device an amount of value greater than or equal to the transfer amount of value. The sending user device is configured to transfer the transfer amount of value to the receiving user device upon receiving confirmation to transfer the transfer amount of value and acceptance by the receiving user device of the transfer. The transfer takes place only when the sending user device and receiving user device are in close physical proximity at a first distance at the time of or shortly after the transfer request.

The system may further include at least one of a sending user account with which the sending user device is associated and a receiving user account with which the receiving user device is associated, the sending user account and the receiving user account further being recognized by the transfer server.

Multiple user devices may be associated with a single user account where the multiple user devices are used by a user of the single user account, and it may be the case that no user device is associated with multiple user accounts.

The value stored on the user devices may be stored locally and may not reside on the transfer server. Transfers between the sending user device and the receiving user device may take place while one or both devices is temporarily without Internet connectivity, and transfers between the sending user device and the receiving user device that take place while one or both devices is temporarily without Internet connectivity may be reconciled once the sending user device and/or the receiving user device regains Internet connectivity.

The value stored on the user devices may include points purchased at parity with local currency, and the value stored on the user devices may be exchangeable for local currency at a later time.

The system may prevent double-spending of value through a secure, encrypted message and a hash thereof paired with the value in the user account, information on a location of the user device, the last transfer in which the user device participated, and the user of the user device, the information being used to validate transfers, and a protocol specifying what actions may or may not be performed once a transfer between the sending user device and the receiving user device has been initiated.

The protocol may include that value sent by the sending user device to the receiving user device cannot be cancelled.

The sending user device or the receiving user device may further include a biometric identification module. Value may not be sent from the sending user device or received at the receiving user device, respectively, until biometric identification information provided by the user at the time of the transfer matches biometric identification information provided by the same user at the time the sending user device or the receiving user device, respectively, is configured.

The biometric identification information of the biometric identification module may be encrypted and entirely local to the user device, and it may be the case that the user device discloses no information concerning biometric identification other than success or failure of the biometric identification.

Value stored on a lost user device may not be recoverable.

The first distance may be 10 cm or less.

The transfer server may unfreeze any frozen value greater than the transfer amount of value after a transfer of the transfer amount of value has taken place from the sending user device to the receiving user device.

A method for transferring value across user devices is provided. The method includes determining that a sending user device stores an amount of value greater than or equal to a transfer amount of value corresponding to a transfer, freezing through a transfer server at the sending user device storing value the amount of value greater than or equal to the transfer amount of value corresponding to the transfer, transferring value from the sending user device storing value to a receiving user device, the receiving user device configured to receive the transfer amount of value sent by the sending user device. The transfer occurs only if the sending user device and the receiving user device are in close physical proximity at a first distance at the time of or shortly after the transfer request.

The method may further include storing value on at least the sending user device and reconciling transfers between the sending user device and the receiving user device that take place while one or both devices are temporarily without Internet connectivity once the sending user device or receiving user device regains Internet connectivity. Value stored on devices may be stored locally and it may be the case that the value stored on devices does not reside on the transfer server.

The method may further include preventing double-spending of value, preventing double-spending of value including pairing a secure, encrypted message and a hash thereof with the value in the user account, using information on a location of the user device, the last transfer in which the user device participated, and the user of the user device to validate transfers, and specifying in advance what actions may and may not be performed once a transfer between the sending user device and the receiving user device has been initiated.

The method may further include using a biometric identification module, the sending user device further including the biometric identification module. It may be the case that transferring value from the sending user device does not proceed until biometric identification information provided by the user at the time of the transfer matches biometric identification information provided by the same user at the time the sending user device is configured.

Using a biometric identification module may occur entirely locally to the user device and may further include disclosing no information concerning biometric identification other than success or failure of the biometric identification.

A sending user device for transferring value in a transaction is provided. The sending user device includes a memory including a secure element configured to store monetary value, a processor including a cryptography engine, a transaction engine, and a key generation module, the cryptography engine configured to encrypt and sign and to verify and decrypt digital signatures of a transaction, the transaction engine configured to implement security features of the sending user device and generate transactions, and the key generation module configured to generate public keys and private keys. When the transaction is verified and the sending user device stores value greater than or equal to a transfer amount of value, an amount of value greater than or equal to the transfer amount of value is frozen in the secure element. Any frozen value greater than the transfer amount of value is unfrozen in the secure element upon the conclusion of the transaction after a transfer of the transfer amount of value has taken place from the sending user device to a receiving user device. The sending user device is configured to transfer the transfer amount of value to the receiving user device upon receiving confirmation to transfer the transfer amount of value and acceptance by the receiving user device of the transfer. The transfer takes place only if the sending user device and the receiving user device are in close physical proximity at a first distance at the time of or shortly after the transfer request.

A receiving user device for transferring value in a transaction is provided. The receiving user device includes a memory comprising a secure element configured to store monetary value, a processor including a cryptography engine, a transaction engine, and a key generation module, the cryptography engine configured to encrypt and sign and to verify and decrypt digital signatures of a transaction, the transaction engine configured to implement security features of the receiving user device and generate transactions, and the key generation module configured to generate public keys and private keys. A sending user device is configured to transfer the transfer amount of value to the receiving user device upon receiving confirmation to transfer the transfer amount of value and acceptance by the receiving user device of the transfer. The transfer takes place only if the sending user device and the receiving user device are in close physical proximity at a first distance at the time of or shortly after the transfer request.

A server for transferring value across user devices is provided, the server including a memory including a secure element configured to store records of transactions transferring value across user devices, a processor including a cryptography engine, a transaction engine, and a key generation module, the cryptography engine configured to encrypt and sign and to verify and decrypt digital signatures of a transaction, the transaction engine configured to implement security features of the and generate transactions, and the key generation module configured to generate public keys and private keys. When the transaction is verified and a sending user device stores value greater than or equal to a transfer amount of value, the transfer server freezes an amount of value greater than or equal to the transfer amount of value. The transfer of the transfer amount of value to the receiving user device occurs upon receiving confirmation to transfer the transfer amount of value and acceptance by the receiving user device of the transfer. The transfer takes place only if the sending user device and the receiving user device are in close physical proximity at a first distance at the time of or shortly after the transfer request.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
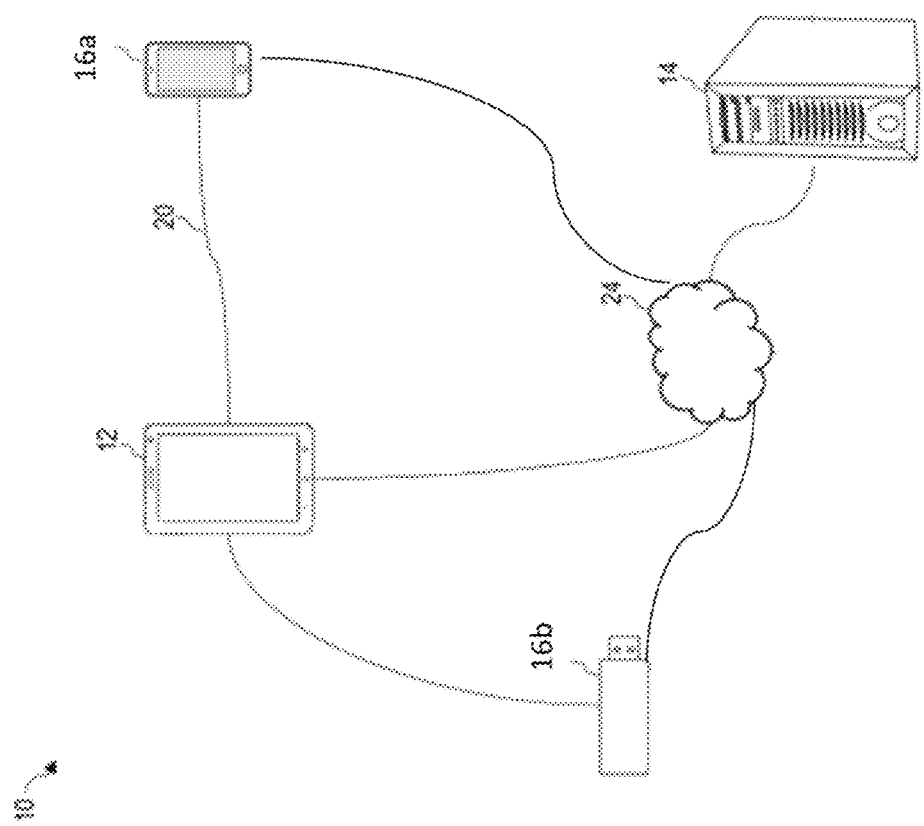
FIG. 1 is a schematic diagram of a digital value transfer system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistant, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage medium or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components is described to illustrate the wide variety of possible embodiments of the present disclosure.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The systems, methods, and devices described herein have physical existence and/or manifest a discernible physical effect or change. The systems, methods, and devices described herein relate to the manual or productive arts, meaning those arts involving or concerned with applied and industrial sciences. The computer systems described herein have a material effect on the working of the invention and cooperate with other elements of the claimed invention.

Moreover, the systems, methods, and devices described herein improve the computer and the functioning of the computer on which they are implemented. For example, a computer device (e.g., a smartphone) implementing the systems, methods, and devices of the present disclosure may advantageously transfer value even when the computer device is offline or a recipient device is offline. Similarly, a computer device implementing the systems, methods, and devices of the present disclosure may advantageously receive value even when the computer device is offline or a recipient device is offline. Thus the functionality of such a computer device is extended and the computer itself thereby improved. Furthermore, the systems, methods, and devices of the present invention solve a computer problem in that computers not implementing the systems, methods, and devices of the present invention may be unable to function to transfer or receive value in an offline context, whereas computers implementing the systems, methods, and devices of the present invention may advantageously continue to function.

The computer on which the systems, methods, and devices described herein run or are implemented is further improved by the offline functionality because the computer is able to process or perform instructions when the instructions are provided (e.g., when an offline transfer is effected) instead of having to store those instructions as well as storing and executing further instructions to process or perform the stored instructions when online access or connectivity is reestablished. Accordingly, the computer uses less processing power (fewer instructions) than known systems, methods, and devices. The foregoing systems, methods, and devices therefore solve a computer problem and provide physicality to the subject-matter hereof.

Furthermore, the devices described herein, the systems including the devices, and the methods performed on, with, or to yield the devices, and the data run on, generated by, or provided or processed in connection with the foregoing correspond to more than generic input, output, or processing on a computer. The funds transferred (i.e., sent or received) according to the systems, methods, and devices described herein represent non-standard output. The transfer of such funds produces a discernible physical effect or change.

Some or all of the functionality of the systems, methods, and devices disclosed and described herein may be provided through an analog device or peripheral. Such an analog device may include a means of communicating with or transmitting instructions to or from a server, a bank, the systems, methods, and devices disclosed and described herein, and/or other analog devices or peripherals. Such peripherals may include a keyboard, a mouse, a laser pointer, or other mechanical or analog peripherals for a user to communicate with or transmit instructions to or from any or all of the foregoing categories.

It will be understood that each of the embodiments disclosed and described herein, in an aspect, includes the functionality of communicating physically and/or in an analog fashion, between a user and devices. Such physical communication forms a part of the aspects of the embodiments. Such physical communication may be accomplished by, for example, a user interacting with a peripheral (e.g., physically depressing keys on a keyboard, physically clicking on a mouse, physically moving and/or depressing a laser pointer) and/or a device providing feedback to a user (e.g. a device causing vibration or other haptics to provide information to a user).

Where the computer systems herein are programmed to run an algorithm, the computer processes the algorithm in a novel manner and the processing of the algorithm on the computer solves problems in the functioning of the computer. The computer and the algorithm form part of a single actual invention that solves a problem related to the manual or productive arts. Running the algorithms described herein on the computer improves the functioning of the computer, and the computer and the algorithm together form a single actual invention that solves a problem related to the manual or productive arts.

Additionally, certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in certain manner. In an embodiment, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In an embodiment, a hardware module may be implemented mechanically or electronically. For example, a hardware module may comprise dedicated circuitry or logic that is permanently configured (e.g., a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operation described herein. In an embodiment in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In an embodiment in which multiple hardware modules or software are configured or instantiated at different times, communications between such hardware of software modules may be achieved, for example, through the storage and retrieval of information in memory structures to which one or more of the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. In an embodiment, the modules referred to herein include processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In an embodiment, the processor or processors are located in a single location (e.g., within a military facility, an office environment, or as a server farm). In an embodiment, the processors are distributed across a number of locations.

The one or more processors may also operate to support performance of the relevant operations in a "cloud computing" environment or as a "software as a service" (SaaS). In an embodiment, at least some of the operations are performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In an embodiment, the one or more processors or processor-implemented modules are located in a single geographic location (e.g., within a military facility, an office environment, or as a server farm). In an embodiment, the one or more processors or processor-implemented modules are distributed across a number of geographic locations.

Some portions of this specification are presented in terms of algorithms or symbolic representations of operations on data stored as bits of binary digital signal within a machine memory (e.g., a computer memory). These algorithms or symbolic representations are examples of techniques used by persons of ordinary skill in the art to convey the substance of their work to others skilled in the art. As used herein, an "algorithm" or a "routine" is a self-contained sequence of operations or similar processing leading to a desired result. In this context, algorithms, routines, and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," of the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

The following relates generally to electronic value transfers between devices, and more particularly to systems and methods for transfers of value where one or both parties to the transfer is offline.

Throughout the present disclosure, reference may be made to Canadian Dollars (CAD) (whether transfer amounts, point systems, etc.). However, it is to be understood that such reference also includes reference to any other currency and that CAD is merely an illustrative example.

The system includes a plurality of user devices. The plurality of user devices include a sending user (value transferring) device and a receiving user (value receiving) device. The sending user device can transfer digital value (e.g., system-specific digital points) to the receiving user device, and the receiving user device can request a transfer of digital funds from the sending user device. A device may be a sending or receiving user device in one electronic transaction and then be a receiving or sending device, respectively, in another transaction.

Throughout the present disclosure, an electronic transaction is to be understood at least to include computer-implemented processes where one party effects a transfer of value to another party. This effected transfer of value includes cases where value is physically transferred and where signals transmitted from a first device cause a second device to store more value. In the latter case, signals from the first device and/or the second device may cause the first device to store less value as a result of the signals from the first device. An inverted case where the second device transmits signals to a first device in order that the second device may store a temporary value to become ordinary value when signals from the first device indicate that the first device has lost an amount of value are further expressly included. In addition, the transfer of value may be included in a complex protocol involving many transmissions between multiple devices, including elements such as Wi-Fi routers, gateways, NFC contact stations, and optical links. These protocols may include many additional elements such as acknowledgements (ACKs), negative acknowledgements (NACKs), and various security features such as the transfer of keys or key elements. Transmission means between devices may include Wi-Fi Direct, QR codes, and NFC.

The present disclosure may duplicate the functionality of and operate to replace the utility of cash or other monetary equivalents. Value may be stored entirely locally on devices, which may include a smartphone app and a smartcard or equivalent, such that transactions may be conducted offline. A smartphone app, smartcard, or equivalent device or application may be used. Users may be able to connect multiple devices they own to a single digital account for storing and tracking digital value. The digital account may be stored on a server platform and may coordinate and facilitate the use of multiple devices by a single user. The digital account may be able to be accessed by any of the multiple devices of the single user. In an embodiment, the use of a digital account may not be mandatory for individual users but may be mandatory for business users. The digital account may be a bank account or similar system for storing value, points, or willingness to extend credit. The digital account may not be a bank account but may link to a bank account stored on the server platform or elsewhere and move value across those devices before paying with one or more of them. Users may also be able to transfer value to and from their own digital account from and to the device(s) connected to their account. In this way, the system may provide users with the benefits of cash in terms of digital anonymity and physical convenience while retaining the benefits of digital currency, if desired, through being able to optionally record transactions and easily carry a device on their person without fear of individual bills or coins becoming misplaced or stolen. A further benefit to storing funds electronically is that value transfer can occur without any physical handling of a medium such as bills or coins. The handling of bills and coins is a known and problematic issue, being a significant contributor to disease transmission, particularly in environments where food is served.

Referring now to FIG. 1, shown therein is a value transferring system 10, according to an embodiment.

The system 10 includes a first user device 12, a plurality of second user devices 16, and a server platform 14. The server platform 14 is connected to the first user device 12, and the second user devices 16*a* and 16*b* via a network 24. For clarity, the second user devices 16*a* and 16*b* may generally be referred to as the second user device 16 and collectively as the second user devices 16 throughout the present disclosure. The second device 16 is an NFC-compatible computing device, such as a smartphone. The second device 16 includes an application ("app") running thereon for communicating within the system 10. The second device 16 is a smart device, for example in a form factor such as a USB key, key fob, or smart credit card.

Information and value of the devices 12, 16 when online is communicated through the network 24 via communication link 20 once a device is online and communicatively connected with the server platform 14.

The server platform 14 is a purpose-built machine designed specifically for facilitating and recording value transferring transactions. Where the first user device 12 and the second user devices 16 are online, the server platform 14 settles transactions conducted between them. Where one or both of the first user device 12 and the second user devices 16 are offline, value transferred is temporarily stored but inaccessible on the receiving user device. The value transferred and the transaction itself are rendered permanent upon reconnection of the offline device(s) to the server platform 14. Upon reconnection, the server platform 14 settles the transaction, and the value transferred and the transaction itself are rendered permanent.

The first user device 12 is a computing device. The computing device may be a mobile computing device, such as a smartphone, tablet, mobile terminal, or the like. The first user device 12 may be a user smartphone that is NFC-compatible with an app for communicating within the system 10 installed. The first user device 12 may be a smart device such as a USB key or smart credit card.

The second user devices 16 may be a computing device. The computing device may be a mobile computing device, such as a smartphone, tablet, mobile terminal, or the like. The second user device 16 may be an NFC-compatible smartphone with the system 10 installed. The second user device 16 may be a smart device such as a USB key or smart credit card. The server platform 14 may be any of a server computer, desktop computer, notebook computer, tablet, PDA, smartphone, or another computing device. The computer components 12, 14, 16 include a connection 20 with the network 24 such as a wired or wireless connection 20 to the Internet. The network 24 may include other types of computer or telecommunication networks. The computer components 12, 14, 16 shown include one or more of a memory, a secondary storage device, a processor, an input device, a display device, and an output device. Memory includes random access memory (RAM) or similar types of memory. Also, memory stores one or more applications for execution by the processor. Applications correspond with software modules comprising computer executable instructions to perform processing for the functions described below. Secondary storage devices include a flash memory, hard disk drive, floppy disk drive, CD drive, DVD drive, Blu-ray drive, or other types of non-volatile data storage. A processor 202 (shown in FIG. 2) will execute applications, computer readable instructions or programs. The applications, computer readable instructions or programs are stored in memory (such as flash memory 211 or RAM 208) or in secondary storage or may be received from the Internet or other network 20. Input devices include any device for entering information into computer components 12, 14, 16. For example, input devices include a keyboard, keypad, cursor-control device, touchscreen, camera, and microphone. Display devices include any type of device for presenting visual information. For example, display devices include a computer monitor, a flat-screen display, a projector or a display panel. Output devices include any type of device for presenting a hard copy of information, such as a printer for example. Output devices also include other types of output devices such as speakers, for example. Computer components 12, 14, 16 include multiple of any one or more of processors, applications, software modules, secondary storage devices, network connections, input devices, output devices, and display devices.

The receiving user device 16 may include a reading unit for receiving wireless communication from the sending user device 12.

Although computer components 12, 14, 16 are described with various components, one skilled in the art will appreciate that the computer components 12, 14, 16 may in some cases contain fewer, additional, or different components. In addition, although aspects of an implementation of the computer components 12, 14, 16 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; a storage element in cloud storage; or other forms of RAM or ROM. The computer-readable media may include instructions for controlling the computer components 12, 14, 16 and/or processor to perform a particular method.

In the description that follows, devices such as first user device 12, second user devices 16, second user devices 16, and server platform 14 are described performing certain acts. It will be appreciated that any one or more of these devices may perform an act automatically or in response to an interaction by a user of that device. That is, the user of the device may manipulate one or more input devices (e.g. a touchscreen, a mouse, a button), causing the device to perform the described act. In many cases, this aspect may not be described below, but it will be understood.

As an example, it is described below that the computer components 12, 16 may send information to the server platform 14. For example, a first user device user using the first user device 12 may manipulate one or more input devices (e.g., a part of the touch screen, a button) to send or request the sending of value to or from a second user device 16. A second user device user using the second user device 16 may receive a notification at a second user device 16. If the transaction proceeds and value is transferred between the first user device 12 and a second user device 16 or between the first user device 12 and a second user device 16, a record of this transaction may be created at server platform 14 after one or both user devices 16 connects to the network 24.

Server platform 14 may be configured to receive a plurality of information, from each of the first user device 12 and the second user devices 16. Generally, the information may comprise at least an identifier identifying the first user device 12, the second user devices 16, or the user(s).

In response to receiving information, the server platform 14 may store the information in a storage database. The storage may correspond with secondary storage of the computer components 12, 14, 16. Generally, the storage database may be any suitable storage device such as a hard disk drive, a solid state drive, a memory card, or a disk (e.g. CD, DVD, or Blu-ray etc.). Also, the storage database may be locally connected with server platform 14. In some cases, storage database may be located remotely from server platform 14 and accessible to server platform 14 across a network for example. In some cases, storage database may comprise one or more storage devices located at a networked cloud storage provider.

The first user device 12 may be associated with a first user account. Similarly, any of the second user devices 16 may be associated with a second user account. Any suitable mechanism for associating a device with an account is expressly contemplated. In some cases, a device may be associated with an account by sending credentials (e.g., a cookie, login, password, public or private key) to the server platform 14. The server platform 14 may verify the credentials (e.g., determine whether the received password matches a password associated with the account). If a device is associated with an account, the server platform 14 may consider further acts by that device to be associated with that account.

Figure 2:
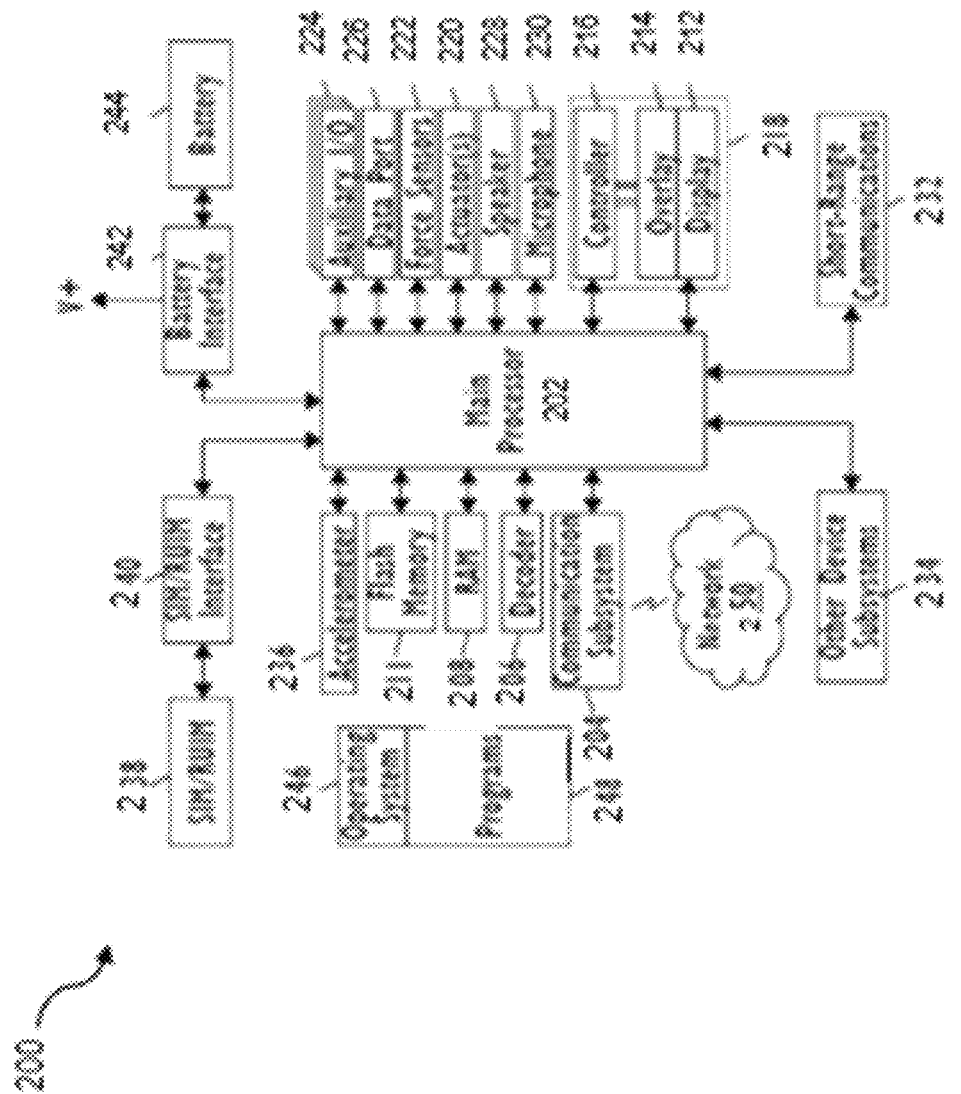
FIG. 2 is a block diagram of a computing device of FIG. 1.

Referring now to FIG. 2, shown therein is a block diagram of a computing device 200 of the system 10 of FIG. 1. The computing device 200 may be, for example, any one of computer components 12, 14, 16, or 16 of FIG. 1.

The computing device 200 includes multiple components such as a processor 202 that controls the operations of the computing device 200. Communication functions, including data communications, voice communications, or both may be performed through a communication subsystem 204.

Data received by the computing device 200 may be decompressed and decrypted by a decoder 206. The communication subsystem 204 may receive messages from and send messages to a wireless network 250.

The wireless network 250 may be any type of wireless network, including, but not limited to, data-centric wireless networks, voice-centric wireless networks, and dual-mode networks that support both voice and data communications.

The computing device 200 may be a battery-powered device and as shown includes a battery interface 242 for receiving and managing one or more batteries 244.

The processor 202 also interacts with additional subsystems such as a Random Access Memory (RAM) 208, a flash memory 211, a display 212 (e.g. with a touch-sensitive overlay 214 connected to an electronic controller 216 that together comprise a touch-sensitive display 218), an actuator assembly 220, one or more optional force sensors 222, an auxiliary input/output (I/O) subsystem 224, a data port 226, a speaker 228, a microphone 230, short-range communications systems 232, and other device subsystems 234.

User-interaction with the graphical user interface may be performed through the touch-sensitive overlay 214. The processor 202 may interact with the touch-sensitive overlay 214 via the electronic controller 216. Information, such as text, characters, symbols, images, icons, and other items that may be displayed or rendered on a computing device generated by the processor 202 may be displayed on the touch-sensitive display 218.

The processor 202 may also interact with an accelerometer 236 as shown in FIG. 2. The accelerometer 236 may be utilized for detecting direction of gravitational forces or gravity-induced reaction forces.

To identify a subscriber for network access, the computing device 200 may use a Subscriber Identity Module or a Removable User Identity Module (SIM/RUIM) card 238 inserted into a SIM/RUIM interface 240 for communication with a network (such as the wireless network 250) or other identity functions. Alternatively, user identification information may be programmed into the flash memory 211 or performed using other techniques.

The computing device 200 also includes an operating system 246 and software components 248 that are executed by the processor 202 and which may be stored in a persistent data storage device such as the flash memory 211. Additional applications may be loaded onto the computing device 200 through the wireless network 250, the auxiliary I/O subsystem 224, the data port 226, the short-range communications subsystem 232, or any other suitable device subsystem 234.

In use, a received signal such as a text message, an e-mail message, web page download, or other data may be processed by the communication subsystem 204 and inputted to the processor 202. The processor 202 then processes the received signal for output to the display 212 or alternatively to the auxiliary I/O subsystem 224. A subscriber may also compose data items, such as e-mail messages, for example, which may be transmitted over the wireless network 250 through the communication subsystem 204.

For voice communications, the overall operation of the computing device 200 may be similar. The speaker 228 may output audible information converted from electrical signals, and the microphone 230 may convert audible information into electrical signals for processing.

Figure 3:
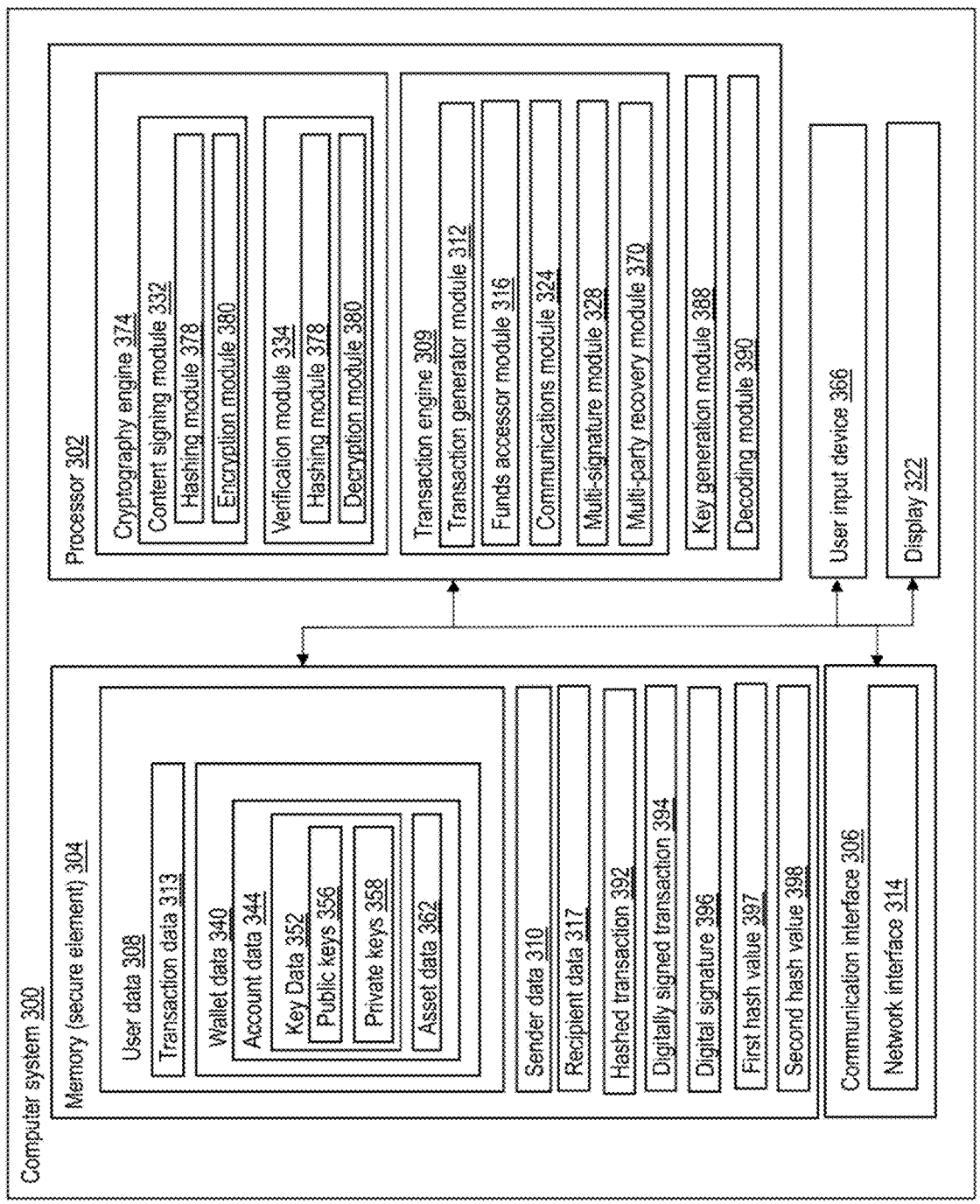
FIG. 3 is a block diagram of a computer system of FIG. 1 for securely transferring digital value with offline functionality, according to an embodiment.

Referring now to FIG. 3, shown therein is a computer system 300 for securely transferring digital value with offline functionality, according to an embodiment. Computer system 300 implements the systems and methods of the present disclosure (or parts thereof). For example, computer system 300 may be used to implement methods 1300 and 1400 of FIGS. 13 and 14, respectively. In another example, the computer system 300 carries out various functionalities of system 10 of FIG. 1. The various components and functionalities of the computer system 300 such as modules and data may be distributed and/or reproduced across multiple components of system 10. In some cases, a certain component and functionality of the computer system 300 may be present on multiple components of system 10.

The computer system 300 includes a processor 302 and a memory 304, including a secure element, in communication with the processor 302. The processor 302 may be processor 202 of computer device 200. The memory 304 may be the flash memory 211 of computer device 200.

Figure 13:
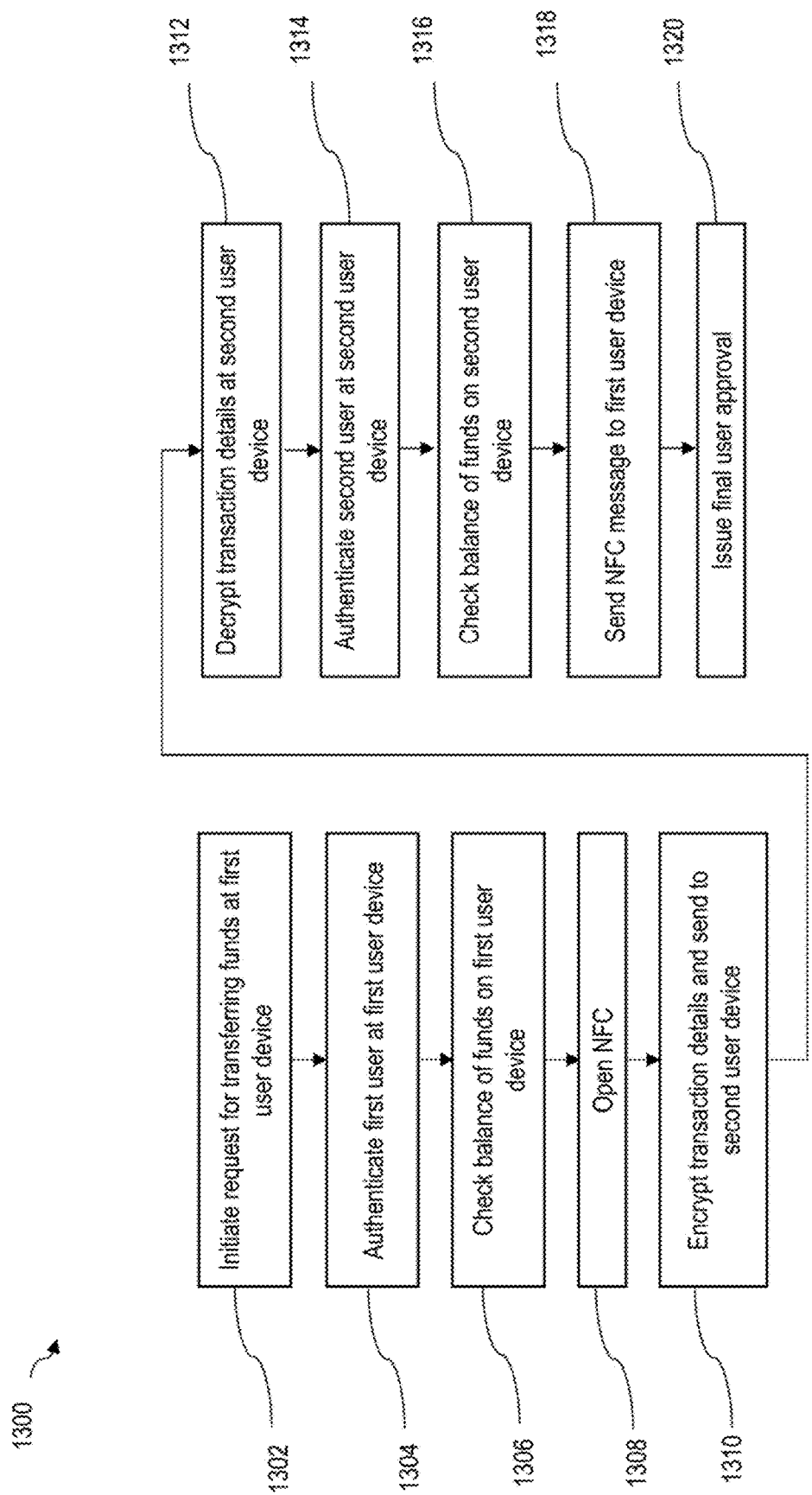
FIG. 13 is a flowchart of a method for preparing a transfer of value between first and second user devices, according to an embodiment.
Figure 14:
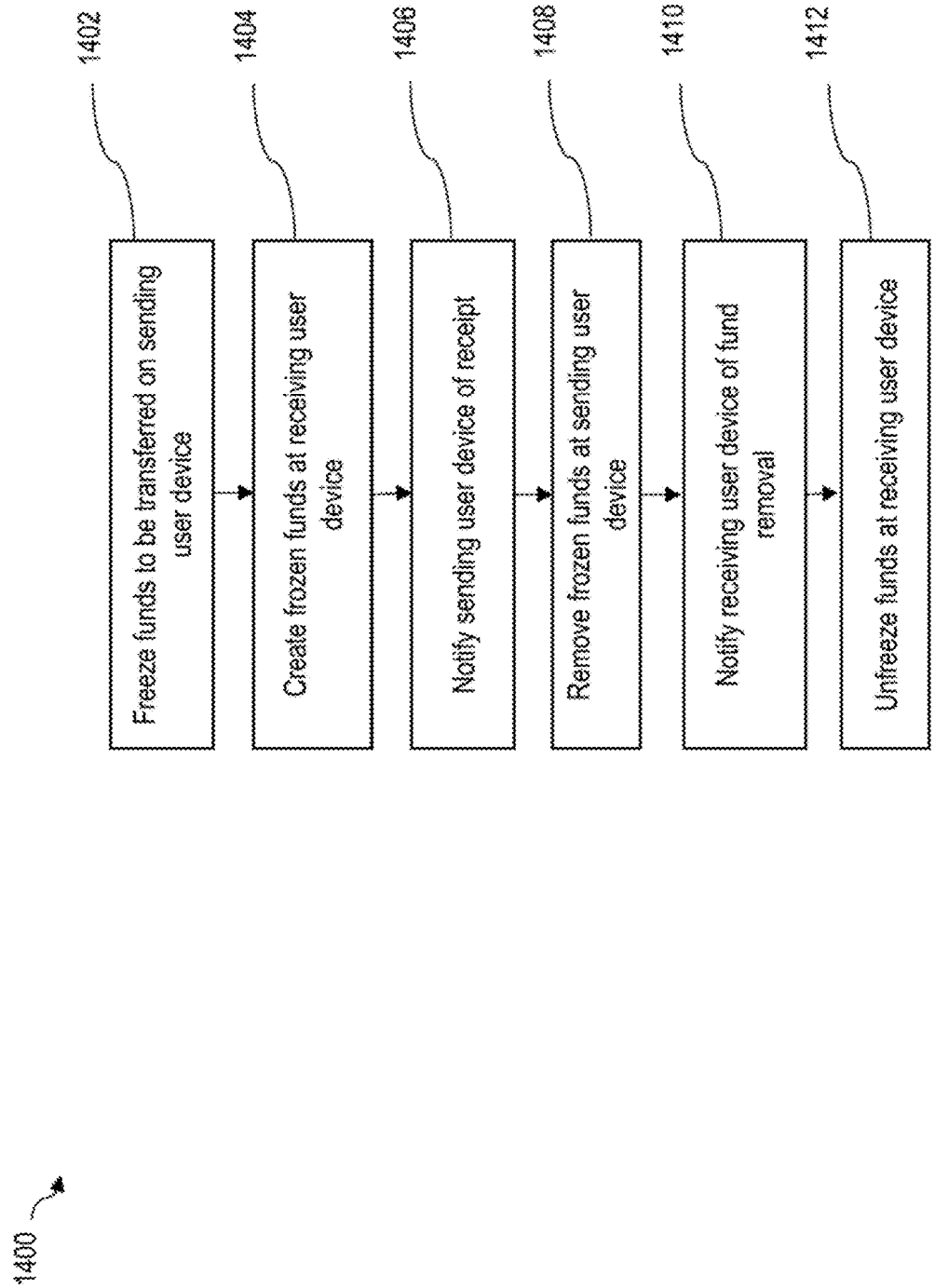
FIG. 14 is a flowchart of a method for transferring value between a sending user device and a receiving user device, according to an embodiment.

The processor 302 may execute the elements (or modules) of the methods 1300 and 1400 of FIGS. 13 and 14 respectively.

The memory 304 may store data received, used, and generated by the methods 1300, 1400.

The processor 302 may interact with data stored in the memory 304 to execute the methods 1300, 1400.

The memory 304 stores user data 308, sender data 310, and recipient data 317. Such storage may occur on a secure element of the memory 304. Secure elements may be part of SIM and smart card specifications, and include protected data elements that can only be accessed through controlled mechanisms. These mechanisms can include controlling which part of the program has access to the data elements, or restrictions like algorithmic responses where a random seed value is given to a secret algorithm inside the protected area, and the response is calculated and is part of the reply. This technique may be used in SIM cards and in bank cards such as debit cards.

The memory 304 may be stored at a first user device (e.g. first user device 12 of FIG. 1), a second user device (e.g. one of the second user devices 16 of FIG. 1), or a server platform (e.g., the server platform 14 of FIG. 1).

The user data 308 includes transaction data 313. The user data 308 also includes wallet data 340 that corresponds to one or more digital wallets. The wallet data 340 includes one or more offline wallets stored on a cold storage device. Such wallet data 340 may hold the identification of a blockchain to facilitate accuracy and tracking of funds. In an embodiment, some or all of the wallet data 340 is sequestered on a cold storage basis. In an embodiment, funds corresponding to a user account are stored in a public or private blockchain.

The wallet data 340 includes account data 344 associated with one or more user accounts. The account data 344 includes key data 352 and asset data 362. The key data 352 includes private keys 358 and public keys 356. The asset data 362 may include metadata associated with the transaction (e.g., amount, asset type). The private keys 358 are stored at the memory 304 of the computer system 300. Such storage may occur on the secure element of the memory 304.

The sender data 310 and recipient data 317 are used to generate a transaction. The recipient data 317 includes a recipient address to which a signal for transferring digital value may be sent.

In an embodiment, the sender data 310 is located on the receiving device (in order to verify the transaction). In an embodiment, the recipient data 317 is located on the sending device (in order to facilitate the transaction).

The computer system 300 further includes a communication interface 306. The communication interface 306 facilitates and, in some cases, restricts or limits communication between components of the computer system 300 or between the computer system 300 and other components of the system.

The communication interface 306 may include a network interface 314. The network interface 314 facilitates communication and data transfer to and from the computer system 300 via a network (for example, network 250 of FIG. 2).

The system 300 includes a display 322 for displaying the user output and input (e.g., touch-sensitive display 218 of FIG. 2).

The processor 302 further includes a key generation module 388 for generating public keys 356 and private keys 358. The key generation module 388 generates key data 352. The key data 362 includes public key 356 and private key 358. The key data 352 is stored in the memory 304.

In an embodiment, such security keys may be required between each end user and the server 14. According to a key generation process (not shown), a unique key is generated to represent a coupling between one of the first user device 12 and the second user devices 16 and the server 14, in the case where an interaction takes place online. It is also possible to generate keys between proximal user devices 12, 16 for the purpose of offline transfer. Such keys may be generated by sending randomized signals (seed) between the devices 12, 16 and/or the server 14 via NFC, QR code, Wi-Fi Direct, Bluetooth, or similar means. The encryption type may include DES, AES, and RSA.

The processor 302 includes a transaction engine 309. The transaction engine 309 is configured to implement various security features of the systems and methods of the present disclosure to keep sensitive user information (e.g., private keys 358) secure.

The transaction engine 309 may include a transaction generator module 312, a funds accessor module 316, a communications module 324, a multi-signature module 328, and a multi-party recovery module 370.

The transaction generator module 312 creates a transaction that may be processed offline. The transaction generator module 312 is configured to generate a transaction from the transaction data 313, which includes the user data 308 and the sender data 310 or the recipient data 317. The transaction data 313 may include an amount, a receiving address, and a timestamp. The transaction data 313 may be inputted by a user via a user input device 366. The transaction generator module 312 may generate the transaction when the computer system 300 is offline.

The funds accessor module 316 allows the user to view the current status of their digital wallet(s). The funds accessor module 316 may further allow the user to retrieve account status data and display account status data to the user via the display 322. Such account status data may be stored on the first user device 12, on the receiving user devices 16, and/or on the server platform 14.

The multi-party recovery module 370 implements a multi-party recovery process including a user and a system provider.

The processor includes a cryptography engine 374. The cryptography engine 374 includes a content signing module 332 and a verification module 334. The cryptography engine 374 can be used to create and verify a digital signature to allow for authentication of a transaction when both device participants in the transaction come back online. Fraudulent transfers that do not have matching keys may advantageously be identified as not authenticated as between the two offline devices.

The cryptography engine 374 and the transaction engine 309 may be on different devices. For example, the transaction engine 309 may be on the server platform 14, while the cryptography engine 374 may be on any of the first user device 12 and the second user devices 16.

The cryptography engine 374 may be configured to communicate with the transaction engine 309, and vice versa. For example, one engine may generate an output that is provided as input to the other engine. Such communication exchange between engines effects various security features of the system. The transaction engine 309 may generate an output indicating that the device is in an online mode (i.e., network-enabled) that is received by the cryptography engine. The received output may prevent the cryptography engine 374 from signing a transaction with a private key.

The content signing module 332 includes a hashing module 378 and an encryption module 380. The content signing module 332 is configured to sign an unsigned transaction. The signed transaction is sent to the server platform 14, for example by providing the signed transaction to the funds accessor module 316. Each device in the system may include a content signing module 332.

The hashing module 378 takes data, such as transaction data 313 (e.g., an unsigned transaction) and applies a hashing function to the transaction data 313 to generate a hash value for the transaction. The hashed transaction 392 is stored in memory 304.

The encryption module 380 uses the hash value from the hashing module 378 and the private key 358 as input data. The encryption module 380 encrypts the hash value using the private key 358. The encryption module 380 applies an encryption algorithm to the input data, generating a digitally signed transaction 394 that may be stored in the memory. The digital signature 396 is stored in memory 304. Such storage may occur at the secure element of the memory 304.

The verification module 334 includes a hashing module 378 and a decryption module 382. The verification module 334 is configured to verify the digital signature 396 of the digitally signed transaction 394 (e.g., the digital signature 396 created using content signing module 332). The verification module 334 can be used to ensure that the transaction data 313 was not changed in transit and that the sender is the owner of the transaction data 313.

The decryption module 382 decrypts the digital signature 396 (such as in a digitally signed transaction 394). The decryption module 382 provides a public key 356 that is associated with a private key 358 that was used to sign the transaction 394 and the digital signature 396 to a decryption algorithm. The decryption module 382 outputs a first hash value 397 via the decryption algorithm. The first hash value 397 is stored in the memory 304.

The hashing module 378 of the verification module 334 applies the same hashing function/algorithm as the decryption module 382 to the transaction data to generate a second hash value 398. The second hash value 398 is stored in the memory 304.

The verification module 334 compares the first hash value 397 (from the decryption module 382) to the second hash value 398 (from the hashing module 378). If the hash values are the same, the verification module 334 verifies the transaction. If the hash values differ, the verification module 334 does not verify the transaction. Failure to verify the transaction may result in the verification module 334 (or other module) generating a message that is sent to the other user device in the transaction or to the server platform 14, alerting the device and/or the server platform 14 that there was an unsuccessful validation of the transaction. Each device in the system may include a verification module 334. The content signing module 332 and the verification module 334 may help protect the integrity of the system while alerting the whole system when faulty devices are found.

The processor 302 also includes a decoding module 390 for viewing transactions encrypted with a public key 356 through use of the associated private key 358.

The processor 302 further includes the communications module 324 for managing layers of a communication protocol. The processor 302 further includes the multi-party recovery distribution module 370, while the other modules of the transaction engine 309 are executed by the processor 302.

Referring again to FIG. 1, the system 10 and methods 1300, 1400 disclosed herein concern a user device 12 that may be a smartcard. The smartcard stores user value that is transferrable to other user devices 16 of other users of the system 10. The other user devices 16, may similarly be smartcards. Any of the user devices 12, 16 may also be smartphones with an app installed to replicate the functionality of a smartcard. Any of the user devices 12, 16 may be a dedicated piece of hardware for implementing the systems, methods, and devices as described in the present disclosure. Any of the user devices 12, 16 may be a USB key or wireless key fob with any of the foregoing stored, processed, and/or implemented thereon. 16

The system 10 and methods 1300, 1400 disclosed herein also concern a user device 12 that is an application on a compatible smart phone that stores value that is transferrable to other user devices 16 of other users of the system 10.

The user devices 12, 16 are capable of receiving value transferred by other user devices as well as transferring value to those other user devices. Where a receiving user device 12 has received value from another user device while offline, the receiving offline device 12 reconciles its value through settlement by the server platform 14 once the receiving offline device 12 has regained Internet connectivity, i.e., once the user device is again online.

To effect the reconciliation between a receiving user's local balance and a sending user's balance, an amount of user funds in a sending offline user device 16 is frozen. Specifically, an amount greater than or equal to the funds the sending offline user device 16 is configured to send to the receiving user device 12 is frozen at the sending offline user device 16.

The receiving user device 12 is configured to receive the amount of user funds to be sent. The receiving user device 12 may be offline or online. The receiving user device 12 receives the amount of user funds even though the sending user device 16 is offline and the receiving user device 12 may be offline. In order to avoid double spending by the sending user, once the sending offline user device 16 regains online connectivity, an amount of frozen user funds of the sending user equal to the amount to be sent is removed from the frozen user's account by operation of the server platform 14. Any additional frozen user funds are then unfrozen. Frozen funds remain in a user's account but are not accessible to that user to spend, transfer, or otherwise send in accordance with the systems, methods, and devices as described in the present disclosure. Unfrozen funds are funds that were once frozen but are no longer frozen. Unfrozen funds have none of the foregoing restrictions.

An amount equal to the amount to be sent may be sent to the receiving user device 12 from unfrozen sending user funds. Once the amount is sent, all frozen user funds may then be unfrozen.

The transfer amount of funds to be sent is according to an electronic transfer agreed upon between the receiving and sending users and established by the receiving user device 12 and the sending user device 16. For example, this transfer may be a part of a transaction whereby the receiving user provides a good and/or service (for example, greens fees to play on a golf course) in exchange for the transfer amount. As a further example, the transfer amount may effect repayment of a debt (for example, where the receiving user previously purchased food or supplies at a golf course for the sending user). As a further example, the transfer amount may be a gift where no goods or services are purchased and no debt repaid by the electronic transfer. As a still further example, the transfer amount may be a loan. Accordingly, the electronic transfer and digital value may entirely replicate the functionality of traditional cash or currency.

The funds to be sent from the sending user device 16 to the receiving user device 12 may take the form of points associated with the sending user. The points are part of a points system whereby a user may acquire points and 'spend' the points acquired as though the points were a currency. The points system may implement a conversion ratio whereby points may be converted into money (e.g., CAD). These points may be fixed at a 1:1 ratio with CAD. A user may purchase points in the disclosed system and method through paying an equivalent amount of CAD. Similarly, a user, and particularly a business user, may cash out an amount of CAD by paying an equivalent amount of points.

In some cases, stores may choose to create their own denominations. The user devices may function similarly to gift cards, showing that they contain value specific to a certain store. Such stores may allow the transfer of such value back to the users' accounts, including any of user accounts hosted on the server platform 14 and accessible on the user devices 12, 16 and accounts held at banks or other financial institutions separate from the present disclosure.

Individual users of the system 10 may optionally create a client account linked to or associated with the user device 12, 16. A client account may be linked to more than one device 12, 16. The user may perform transfers across devices 12, 16 connected to their account. Such transfers across a user's multiple devices 12, 16 may be accomplished more simply than transfers between the devices 12, 16 of different users. In order to conduct transactions from a bank, the user may be required to have a client account.

Users of the system 10 may include vendor users, such as businesses and corporate and institutional clients. Vendor users of the system 10 may be required to maintain a client account associated with their one or more devices 12, 16. Client accounts of the vendor users, hereinafter termed vending accounts, may differ in several respects from the ordinary client accounts hereinbefore described. The system 10 may require that the vendor contribute and/or maintain a minimum initial balance in their account. This minimum balance requirement and other qualities of the vendors may mean that the vendors are more trusted by the service. The system 10 may provide vendor users with benefits for having a vendor account and maintaining a minimum balance in the vendor account. These benefits may be greater than benefits enjoyed by ordinary users who maintain the ordinary client accounts. The system 10 may maintain a record of all transactions conducted involving the business' devices 12, 16 in a manner accessible to the vendor user. The system may store an online pool of money linked to the vendor account in a database. This may allow vendor users such as businesses to store and access larger sums of money without having to conduct frequent bank transactions. The additional protections and verifications provided by the system 10 to a vendor or business account may include insuring a certain amount of funds for such an account.

User accounts may be hosted, updated, and/or maintained on the server 14, for example, in memory 304.

The system 10 may include account identifiers ("ID's"). Account ID's may prevent a transfer of funds to an unsupported user's account. Account IDs may prevent the user device 12, 16 from allowing such an unsupported user to login to and use the user device 12, 16. Such Account IDs may facilitate two-factor authentication.

Where the account of the unsupported user used to exist but was either discontinued or the data thereof was modified, the system 10 may prevent the account from operating (e.g., sending/receiving digital value) until verified by the system 10 using a central, trusted database (stored, for example, at server platform 14). Verification of the questioned account may use a combination of signatures, database updating, and so on, to approve the user.

The system 10 may implement various protocols in order to circumvent potential money transfer issues. This includes protocols for any one or more of: conducting online/offline syncs; what to do in case a transaction is cancelled or an error occurs; how to deal with NFC communication errors or time-outs; what to do if there is inadequate space/a user has too many funds; and how to integrate funds added and sent from numerous sources and accounts.

In general, fund change requests are validated in-app/card on the user devices 12, 16. To validate a fund change request, users, accounts, data, funds, and so on, are all authenticated, validated, or identified, with checks occurring in-app or on the card at user devices 12, 16. The system 10 implements a response protocol in case a breach or a third party attempting to force a transaction/data overwrite is detected. The use of unique IDs, timestamps, and so on, may provide greater security for user funds/digital value in making fraud difficult and easy to detect. The system 10 may be configured such that funds transfer may only occur if adequate authorization is received and may follow a well-defined scheme with failsafes.

The system 10 may advantageously ensure that there are adequate available funds in a user's account between a maximum and minimum balance amount. In case of a transaction error, a protocol is in place for transaction reporting, data storage, and the like.

In the system 10, data modification may be mitigated by limiting what NFC can/cannot initiate and what permissions external parties/networks have. Data modification may further be mitigated through ensuring data cannot be modified by encryption techniques. Data modification may further be mitigated through making use of secure storage and a secure element on the user devices 12, 16. Data modification may further be mitigated through using hashes and signatures to check for data modification. Data modification may further be mitigated through requiring authorization for reading/writing data. Data modification may further be mitigated through never allowing sensitive data to leave the secure element or the user devices 12, 16. Data modification may further be mitigated through minimizing interactions with the secure element and database. Data modification may further be mitigated through conducting proper authentication and validation of user devices 12, 16 with which communication is occurring.

As well, the system 10 defines a protocol in case a breach occurs or modification of data is noticed by the server 14, by the user device 12, 16, or 16, etc.

The double spending problem common to physical cards, digital wallets, and the like may be avoided by authenticating money by having funds that are stored on the user device 12, 16 be authenticated by having funds paired with a secure, encrypted message and its hash. Data stored on the memory 304 to verify users and transactions and to prevent fraud may include additional information, such as location information, last transfer information, owner information, etc. The additional information may be used to determine whether the user funds/digital value are in the correct location (i.e., the correct user device 12, 16) and may be able to be spent.

In general, users may not be able to cancel sent value. General security measures may be used by the system 10 to mitigate the risks associated with digital transfer of funds, specifically of storing funds on the user devices 12, 16 and/or transferring funds to the user's account. This may be done by storing transaction data in the secure element (SE) at the memory 304 or a secure database at the user device 12, 16 and using encryption and hashing techniques (e.g. as used by content signing module 332 and verification module 334). Furthermore, protocols may be implemented if a breach is detected.

The system 10 may validate incoming funds and outgoing funds to ensure their legitimacy. The validation may be performed by adding additional data to the funds which cannot be replicated and which is used to validate the coins. The additional data may be in the form of a signature on the coin/attached message when first issued to act as a stamp of approval. Other means of making the funds unique and identifiable as "belonging" to the user can be implemented.

The system 10 may implement authentication protocols, including guidelines for minimum password length, security questions, biometric/two-factor authentication, and so on. Such protocols may help minimize the risk of illicit entry into a user's account. Furthermore, the system 10 may encrypt and securely store sensitive information in the SE of memory 304 so that the sensitive information cannot be easily stolen.

The system 10 may conduct checks to determine whether numerous accounts exist and are conducting transactions in parallel with the same ID but on different user devices 12, 16 and/or in different locations. In some cases, user devices 12, 16 may be confirmed, authorized, and added to a "my devices" section in the database of server 14; any unauthorized user device 12, 16 being used with the account may result in an error and be flagged. To overcome the addition of extra phones, authorization may be requested from an initial user device 12, 16 through a notification sent to the user. The notification may be an SMS message. The notification may be an email.

The system 10 may include mechanisms for freezing a user account or removing sensitive information from the user account and/or the user devices 12, 16. Freezing of the user account prevents transactions under that account. In the case of theft, there may be a way to freeze one's account so as to not allow any transactions, and to remove sensitive information. Account freezing and sensitive information removal mechanisms of the system 10 may only be implemented on the device 12, 16 if the device 12, 16 goes online. An updated database on server 14, or the flagging of the account, may allow for a receiving party to notice and cancel a transaction, provided that the receiving party has synced their device 12, 16 to the network 24 recently.

Account information may not be modifiable. The system 10 may use hashing, encryption, or the like to implement non-modification to protect against tampering. The app may be configured such that incorrect information cannot be transmitted.

Minimizing the time the NFC is "open" as well as decreasing the distance the NFC is able to reach may help advantageously prevent third-party attacks. The NFC may automatically shut down if an additional device 12, 16 is noticed. Messages may be encrypted, and hashes and signatures may be used to check against tampering. An efficient transfer and communication flow protocol may be devised which assumes the presence of malicious parties to circumvent message tampering, fund retention, theft, and more.

The system 10 may implement encryption or tokenization to prevent eavesdropping, i.e., interception of communications by malicious actors. The system 10 may implement HTTPS protocols to advantageously increase security by encrypting data exchanged via TLS/SSL asymmetric cryptography. Where the user device 12, 16 is a smartcard, employing tokenization of card and transactions details as in Apple Pay and Google Pay may also increase security. An issuer of the smartcard user device 12, 16 can encrypt card details by sending a token generated through a one-way non-reversible cryptographic hash function. Only the unique token is stored on the user's device 12, 16 (no card details). The system 10 may encrypt transaction details using a one-time key to generate tokenized payment information to transmit to the user device 12, 16.

The system 10 may advantageously avoid data leakages or breaches by adding measures to increase server security. For instance, it may be more secure for the system 10 to facilitate connection to the server 14 through SSH keys rather than password-based logins. SSH key authentication is an encrypted protocol for the system 10 to administer and communicate with servers. In this protocol, private and public key pairs are created for authentication. The system 10 keeps private key 358 secret at key data 352, while the public key 356 can be shared (i.e., placed in a directory on the server 14, such as key data 352). When a client connects to the server 14, the server 14 will generate a random value to send to the SSH client. The client then uses a private key 358 to encrypt the response and send an encrypted reply to the server 14. The server 14 decrypts the reply using the public key 356. Such encryption and decryption may take place at content signing module 332 and verification module 334. The server 14 can only decrypt the random value if the client possesses the private key 358. Password-based logins are easy to hack as malicious users can repeatedly attempt to access a server 14 by trying different combinations. SSH keys have many more bits of data than a password, and so there are advantageously significantly more combinations that an attacker would have to try to the point where SSH keys are considered uncrackable.

The system 10 may incorporate firewalls. The firewalls control how services are exposed to the network 24 and what types of traffic are allowed in and out of the server 14. Firewalls may further advantageously be incorporated, as they control how services are exposed to the network 24 and what types of traffic are allowed in and out of a server 14. The firewalls may ensure that access to software is restricted according to certain categories, for example: a public services category, which can be accessed by anyone; a private services category, which can be accessed by authorized accounts; and an internal services category, which can be accessed only within the server 14 itself. The firewall may serve as a base layer of protection by limiting connections to and from services before traffic is handled by the application on the user devices 12, 16 or the server 14.

Finally, NFC tags may also be uniquely identifiable as belonging to the user. Any transaction the user conducts may be stored in a database or on the tag itself.

Where user accounts are maintained or where transactions are recorded, it may be possible to recover user value stored on one or more user devices 12, 16 even where such user devices 12, 16 have been lost.

RFID and NFC inlay with antenna may advantageously allow for wireless communication between devices 12, 16 and readers 12, 16 in the aspect of the present disclosure where the user device 12, 16 is a smartphone containing an app installed for communicating within the system 10.

The system 10 may include a defined fund data structure on the user device 12, 16. The fund data structure holds relevant encrypted data and a (potentially salted) hash against which details of a pending transaction may be compared. The hash may be a salted hash. The fund data structure may allow funds on an offline user account to be uniquely identifiable as belonging to the user linked to the offline user account through the user device 12, 16. The fund data structure may prevent the funds of a user account from being replicated, imitated, or used if received by improper means (e.g., theft). Funds on an offline user account may be uniquely identifiable as belonging to the user through the user device 12, 16 through any one or more of the foregoing. The funds cannot be replicated, imitated, or used if received by incorrect means (e.g., theft). This functionality may be implemented by defining a fund data structure (not shown) on the user device 12, 16 that holds relevant encrypted data and a (potentially salted) hash against which details of a pending transaction may be compared. Because the identity of the sender of funds may be advantageously hidden in the fund data structure, the funds may be verifiable as coming from the sender only if the funds are legitimate.

In an embodiment, the user device 12, 16 includes an integrated circuit (not shown) for securely storing encrypted data. The integrated circuit may provide additional security. The integrated circuit may also perform fingerprint authentication. The fingerprint authentication may occur within the user device 12 with only a binary success/fail message/signal sent to a POS user device 16 for receiving funds. The integrated circuit authenticates fingerprints locally on the user device 12, which may advantageously secure the fingerprint data by not having the fingerprint data disclosed or exposed to other user devices, such as the user device 16. The user provides his or her fingerprint to the user device via a user interface with a biometric input (e.g., a touchscreen). The integrated circuit configured for fingerprint authentication generates fingerprint data from the input data and compares the received fingerprint data to fingerprint data on record in the user device 12. The integrated circuit determines whether the received fingerprint data is a match for the stored fingerprint data. If the received fingerprint data matches the stored fingerprint data, the user is authenticated. The determination may be binary pass/fail determination. The integrated circuit may then generate a pass/fail signal based on the determination. The pass/fail signal is sent to a receiving user device 16 (e.g., the POS user device 16). The receiving user device 16 may be configured to rely on the pass/fail signal received from the sending user device 12. The user device 12 is configured such that access to the stored biometric (e.g., fingerprint) data is only accessible only to the operating system of the user device 12 and to authenticated users. Fingerprint authentication may occur at the sending user device 12, the receiving user device 16 (such as a POS user device 16 for receiving funds, for example a merchant device) 16, or both. In order to provide users of devices 12, 16 of the disclosed system and method with additional security, there is provided a compatible integrated circuit for securely storing encrypted data. Further provided is fingerprint authentication, which will occur in the same compatible integrated circuit for securely storing encrypted data. Fingerprint authentication may occur within the user device 12, 16 itself, with only a binary success/fail sent to a POS user device 12, 16 for receiving funds. Authenticating fingerprints locally only on the user device 12, 16 advantageously secures fingerprint data in that said data is not disclosed to other devices 12, 16. A user's fingerprint is instead compared with the fingerprint on record in the user device 12, 16, with that user device 12, 16 only sending a signal to indicate success or failure with respect to said fingerprint authentication. Access to such stored biometric data is only available to the operating system of the user device 12, 16 and to authenticated users. Fingerprint authentication may occur at the sending user device 12, 16, the receiving user device (such as a POS user device for receiving funds, for example a merchant device) 12, 16, or both. Alternately, fingerprint authentication may not be provided.

Depending on processing requirements of the user device 12, 16, the user device 12, 16 may further comprise a power cell such as battery 244. Power requirements in general will depend on the chosen input/output methods. The recommended battery type is a flexible lithium polymer battery. The chosen input/output methods of the user device may include buttons or dials as well as an LED display 212.

Figure 4:
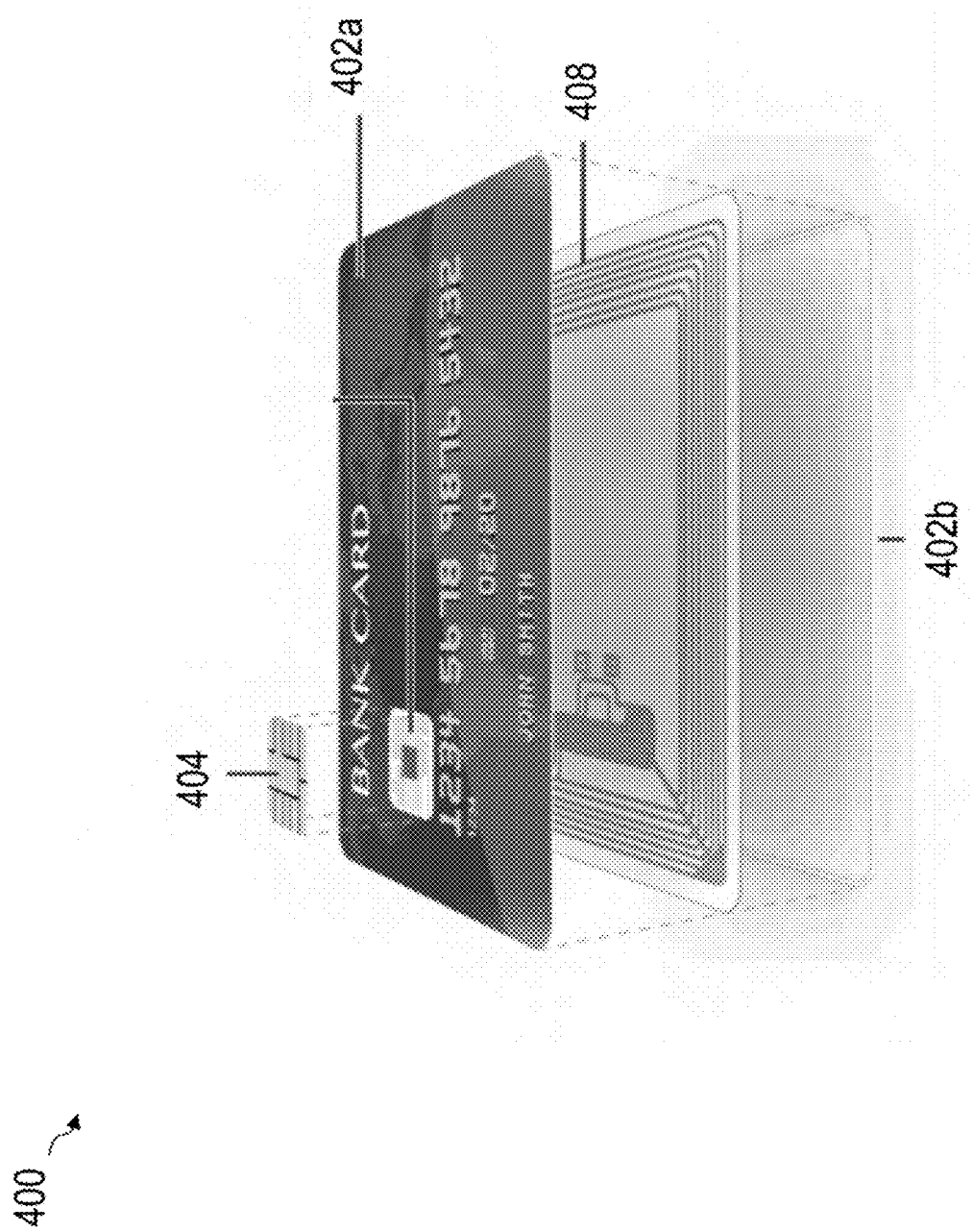
FIG. 4 is an exploded view of a smartcard user device of FIG. 1, according to an embodiment.

Referring now to FIG. 4, shown therein is a partially exploded view of a smartcard user device 400, according to an embodiment. The smartcard user device 400 (or smartcard 400) may be the user device 12 or 16 of FIG. 1.

The card user device 400 has a first plastic card layer 402*a* and a second plastic card layer 402*b*.

The plastic layer 402*a* contains an embedded microchip 404, buttons/displays (not shown), an RFID/NFC inlay 408, secure element (not shown), and power cell (not shown). A top plastic layer 402*a* and a bottom plastic layer 402*b*, one which goes beneath the RFID/NFC inlay 408, are shown in FIG. 4.

Funds are authenticated from the user's bank account as the user's own funds. After authentication, the user may make a payment. This approach may provide a notification once the money is transferred into the system 10 of the present disclosure, typically within a window of 3-5 days.

Depending upon the authentication, users may have to wait until all funds become available or may be able to have immediate access to a portion thereof.

User authentication upon sign-up may be performed using a passcode or biometric identification. The passcode or biometric input data for biometric identification may be provided via a user interface of the user device 12, 16.

A transaction flow of a method according to an embodiment will now be described. The transaction flow may help mitigate errors, overwrites, and overcome malicious intent during an offline transaction. This description assumes a P2P offline transaction.

First, a transaction (transfer) is initiated by a first user device 12. The first user device 12 is requesting either the receipt or sending of funds through a second user device 16 during the transfer. The first user inputs a request into the first user device 12. The request may be entered via a user interface executing at the user device 12. The request is validated by performing checks. The checks may be performed locally at the user device 12 or at the server platform 14. The checks include authenticating the first user. Once the first user is authenticated, the user device 12 checks whether the first user device 12 has adequate storage space for transaction data and/or funds to effect the transaction. Proper account selection is thereby ensured. In cases where funds will be sent according to the transfer, the funds are validated. Validation of the funds may occur on the user device 12 or at the server 14.

Once validation is complete, NFC communication through the first user device 12 may be opened. Transaction data comprising details about the transaction are encrypted and signed. The transaction data may include, for example, an amount of funds requested, a first user ID, a first user role, a second user ID, a second user role, and any other information relevant to the transaction, such as information identifying the parties to the transaction or other participants in the transaction or the subject matter of the transaction. The encrypting and signing of the transaction data may be performed by the content signing module 332 at the first user device 12. The signature may act as a stamp of approval. The encrypted and signed transaction data may be sent to the second user device 16 via the NFC. The first user device 12 may also generate a hash of the transaction data, which may further be encrypted and signed transaction data, and send the hashed transaction data to the second user device 16 with the encrypted and signed transaction data via the NFC.16.

Additional security measures may be implemented by the user devices 12, 16 and/or by the server 14 to validate users of the user devices 12, 16, hereinafter termed first and second users, respectively. In an example, the devices 12, 16 may generate a private key 358 using user-specific information (i.e., information that is known by the first and second users) and encrypt messages between components of the system 10 using the private key 358. The user-specific information may be, for example, a shared secret number or password between the first and second users. Such additional security measures may be a selectable option (i.e., an addition) or configurable setting, for example allowing for the option of including a security question. The option of selecting an additional security measure (i.e. turning the security measure on) may be presented to the user via a user interface at the user device 12, 16 configured to receive input data for configuring the setting of the additional security measure.

The second user's device 16 receives the transfer request. The received transfer request includes the encrypted and signed transaction data and the hashed transaction data. The second user device 16 decrypts the transaction data using verification module 334. The second user device checks the decryption result against the hash of the transaction data 313 to check for tampering. The transaction may be halted if the verification module 334 determines that the decrypted transaction data does not match the hashed value of the transaction data (as that suggests the message has been modified). If the first user device 12 is to send money, then the second user's device 16 checks for adequate space and conducts any other validity checks. Validity checks may include any of ensuring the second user is a valid user with a valid account. Validity checks may occur prior to sending an NFC message which approves and initiates the transaction. If the second user device 16 is to send money, the second user device 16 checks that there are adequate available funds on the second user device 16 by comparing a (pending) transaction amount with the amount of user funds stored thereon, and that those funds are valid, as well as verifying the account, after which a transfer may begin. Users may be prompted to approve a transaction. Failure of any of these checks results in the transaction being cancelled. A cancelled transaction results in the second user device 16 sending the first user device 12 a cancellation message, and an NFC capability for effecting the transaction being suppressed.

In an example where the first user device 12 has requested the second user device 16 send funds, the funds to be transferred from the second user's account may be separated from the rest of the funds. For example, the second user funds to be transferred may not be removed yet from the second user account but may be in a pending state. Funds in the pending state are inaccessible for further transfer. That is, the data regarding those funds remain on the user device 16 such that the data are no longer usable in further such transactions while frozen, and the data may also be sent to the first user device 12. The frozen funds still exist and are valid (this check was performed previously). The second user device 16 sends an approval message to the first user device 12. The approval message may be encrypted and signed. The approval message may contain authentication information or transaction-specific details to make replication more difficult. The approval message may be hashed to provide a check against tampering. The hash may be a salted hash.

The first user device 12 receives the approval message and checks the signature to ascertain validity of the pending transaction for transferring digital value. This checking may occur in verification module 334 of the first user device 12. Funds may now be added to the first user's account through the first user device 12. In an embodiment, these funds may be created in the first user's account. However, these added/created funds may be created but not integrated with the account through first user device 12 quite yet. The newly created funds are placed in a pending state (similar to the second user's funds). The first user device 12 sends a message to the second user device 16 confirming that the first user device 12 received the funds. The second user device 16 can then remove the funds from the pending status in the account. The funds are removed from the account at the second user device entirely. Following removal, a funds erasure confirmation message confirming that the funds have been erased from the second user device 16 may be sent to the first user device 12.

Upon receiving the erasure confirmation message from the second user device 16, the funds may now be added to the first user's account. Once added to the first user's account, the funds may be used (once the erasure confirmation is received) (NFC may be broken at this point). The first user device 12 may keep track of available funds and ensure that the transfer occurred properly by comparing the previous, new, and promised fund amounts.

There are numerous checkpoints at which communication errors and cancellations may occur. However, after approving the transaction, the second user cannot cancel the sending of the funds. Nevertheless, the first user may be allowed to cancel the transaction, but only when the second user device 16 sends confirmation of the transaction and the transaction data. This cancellation may occur manually by the first user or automatically by the first user device 12 if a discrepancy is found between the funds the second user purports to send through the second user device 16 and the funds the first user had requested through the first user device 12. Information of such discrepancies is relayed to the second user device 16, and the funds are added back to the second user account from the pending status and accordingly removed from the first user's account automatically. The first user cannot cancel the transfer through the first user device 12 once confirmation of fund erasure arrives from the second user device 16.

A checking failure after the initial verifications (i.e., after the first user device 12 sends confirmation of having received funds or the second user device 16 sends erasure confirmation) implies tampering or system error. This may result in suspended activity, with the funds remaining in or being placed in the pending state for both accounts of the first and second parties. Transaction data/details may be recorded to later be relayed to a trusted third party for evaluation. Undoing the transaction may be attempted, by sending the funds back to the second user on the second user device 16 and removing them from the first user's account through the first user device 12.

NFC communication errors may occur throughout the transaction due to technical failures, i.e., the NFC may be unable to transmit certain data. If a notice of receipt of such an error is sent by the first user device 12 but not received at the second user device 16, funds remain in the pending state for both associated user accounts (i.e., the first and second user accounts). The second user device 16 prompts the first user device 12 for another confirmation of receipt. After a predetermined time-out period, the funds may be added back to the second user's account on the second user device 16. A message may be sent to the first user device 12 indicating time-out or that the funds have been added back to the second user account. The funds are removed from the first user's account by the first user device 12. This NFC error may be noted in the system by both first and second user devices 12 and 16. The NFC error may be relayed to an online database at the server 14 in case of complaints once network connection with network 24 occurs.

Alternatively, if erasure confirmation is sent by the first user device 12 but not received by the second user device 16, the first user device 12 may prompt the second user device 16 for another confirmation. After a time-out period, the funds are removed from the first user's account at the first user device 12. The first user device 12 sends a message to the second user device 16 informing of this erasure, including fund details. If the second user device 16 receives this message, the second user device 16 may add the funds to the second user account. Otherwise, the funds are lost. An error message and associated transaction details may be recorded by both user devices 12 and 16 and potentially relayed to the database at the server 14 once connected to the network 24.

Finally, NFC timeouts may occur, thus cutting off communication and cancelling the transaction between the two parties.

If NFC breaks before confirmation of fund receipt is sent by the first user device 12, the funds are removed from the first user device 12 and are added back to the second user's account immediately after the break is noticed.

If the funds were erased and a notice was sent, immediately after which the NFC breaks, the funds are gone from the second user's account at the second user device 16 and are also removed from the first user's account at the first user device 12. Transaction details may be recorded and forwarded once network connection with network 24 occurs.

The process for a user interacting with the user's bank account (that is, transferring funds to and from a user's own account and, more specifically, to and from the user device 12, 16) has been described previously. This protocol will help ensure that no double spending, fund overwriting, or the like, occurs during the transfer process. This protocol makes extensive use of offline/online user account syncing when updating funds on various user devices 12, 16. The protocol exploits the creation of separate temporary sub-wallets to store funds prior to integration with existing funds in order to avoid fund overwriting/double spending. If a user device 12, 16 is offline when the funds are to be transferred, the funds are considered pending and appended to a user's online account. This is, however, a temporary mechanism and not a permanent storage area in order to avoid fraud and mitigate risk. Note that this is not completely applicable for business accounts.

A merchant user device 12, 16, when having reached a user- or company-defined maximum fund storage, may (assuming the merchant user device 12, 16 is connected to the internet or other network 24) immediately transfer funds to the online account of that merchant. Such transfer is done by simple network communication according to secure protocols, and any messages are encrypted. Details regarding the funds (funds transferred include the relevant data, however their "location" will be rewritten to "online pool," and they will not be allowed to be spent offline), the business, any associated ID's/certificates, are transferred as well. Such transfer of details allows the system to identify which account to append the funds to and also validate the message and user in order to mitigate fraudulent activities/imposters. Hashes may be used to ensure message integrity. Funds may be initially moved to a "temporary storage wallet" on the device that holds them until an online sync is conducted, so that data communication does not occur directly with the wallet being used by the user. This may allow transactions to continue being conducted, and may any error occur, ensures that no fund overwrites occur with the offline funds. Any money transferred to the online pool may be done in small increments. While this may mean more frequent messaging and thus a larger chance of data capture, this procedure may mitigate the risk associated with network communication in that any lost funds may not cause as many issues as if a large sum were lost. Such an "online pool" may allow merchants to conduct many transactions and have a lot of money removed from their bank account (thus minimizing bank transaction fees), while improving security by storing the details online, encrypted, in a secure database (for example on server 14).

Aside from additional funds, constant NFC syncing within the system 10 may occur when the user device 12, 16 is connected online. The online database at server 14 may store business details, including available offline funds, transaction history, time of last sync, and on the like. This helps with any insurance claims and may help mitigate risk for businesses which are often or always online while further ensuring that not a lot of data is stored on the physical user device 12, 16. As mentioned previously, the details of any conducted transaction may be synced to the user accounts and stored.

As previously discussed, any recorded data in the database at server 14 may be encrypted. Encryption may occur prior to data being uploaded from the user devices 12, 16 to the server 14 and account information may also be tokenized. The system 10 may employ its own encryption techniques or use third-party software. In addition, the system 10 may utilize the security schemes offered by the database, thus further decreasing risk.

Funds may be "downloaded" onto the user device 12, 16, when necessary. When offline funds dip below a user- or system-defined minimum, funds from the online pool (assuming internet connectivity) may be transferred to the user device 12, 16 in a scheme that is the reverse of the scheme for fund uploading. For example, encrypted data may be sent to the "temporary storage wallet" of the user device 12, 16 and rewritten to allow offline spending and to change the fund location and further moved to the offline wallet for transaction conducting. All communication may be secured and encrypted.

Similarly, if offline funds exceed a user- or system-defined maximum, funds may be transferred automatically to the online pool (assuming internet connectivity).

Money in the online pool may be aggregated and sent to the user's bank account in batches, depending on user- or company-defined thresholds. This may allow merchants to collect interest on the money while also decreasing transaction costs. Similarly, if funds on a user device 12, 16 dip below a certain amount, money may be transferred from the user's bank account to the user device 12, 16, either manually or automatically. The transfer may use encrypted communication. The transfer may use fund validation. The fund validation may ensure that the funds to be redeemed as money are legitimate and have a certificate of approval (i.e., that the funds, along with the merchant and user device of origin 12, 16, have been authorized and validated as belonging to the system). The fund validation may use a secure gateway to process bank transactions. Receipts and invoices, or other confirmation means, may be sent to the user and recorded in the memory 304 in order to ensure that the transfer was conducted properly.

In case of a time-out while completing an online sync, an error message may be sent to the database (or stored offline and "queued" to be sent when online) on the server 14. Funds may remain on the user device 12, 16 in the "temporary storage wallet," along with an associated "error number" or message. In this way, the system 10 may conduct a check to see if the funds were properly transferred online, and if so, the funds may be removed from the user device 12, 16. If the funds were not properly transferred, the transaction can be allowed and re-tried.

What data to include as transaction data 313 may depend on the final transaction and product architecture. However, some options include:

The data may include a signed "certificate of approval" from an issuing authority (i.e., the system 10). This may be added when funds are originally transferred from a bank account, or when received from an authorized NFC tag; such a certificate proves that the funds originate from a trusted source and can thus be spent, as the transfer has been approved and is backed by monetary value.

The data may include funds type data. The funds type data indicates a type or nature of the funds. The nature of the funds may be noted. That is, if the funds comprise store-specific loyalty points, this may be tracked, as well as the associated permissions (alternatively, different sub-wallets may call for different sub-classes of funds with their own defined functions, permissions, and so on).

The data may include a user ID. A user ID of the current fund owner may be recorded, which is also sent during the transaction initiation, and thus it can be ensured that the funds are owned by the user conducting the transaction. However, this ID need not be sensitive; that is, this ID acts as a "username" that uniquely identifies a user but has no link to their account, bank, and other sensitive information.

The data may include an encoded token. A unique, product-specific, encoded token may be used to help identify the denomination. Alternatively, all funds may be given a unique ID which is kept track of upon creation. Otherwise, the signature may be enough to prove validity.

The data may include additional permissions. Any additional permissions (i.e., location-specific usages), date/time of last transaction and creation, previous transaction details, and so on may be noted, depending on security requirements, the devised scheme, and user preferences.

When funds are to be sent or received, the data may be used to verify the legitimacy of the funds, check tampering (against a hash), and make the creation of fake funds more difficult. Any incorrectly formatted or erroneous funds may be immediately removed. The user and/or the transaction associated with the incorrectly formatted or erroneous funds may be flagged, and details may be forwarded to the central database to perform a check.

The foregoing procedure, modified as appropriated, is performed for specific accounts and user devices 12, 16 that perform NFC transactions. These user devices 12, 16 include smartcards, phones and apps thereon, and NFC tags for in-store fund addition. The foregoing procedure may advantageously ensure that the funds being spent are, in fact, unique to the product, have been approved, and were not created/added by a third party.

Accounts, upon creation, may be associated with a unique account ID. The account ID may be tokenized and stored on the user device's 12, 16 SE at memory 304. The account ID may be used for account verification when the user interacts with the user device 12, 16 (e.g., during an online sync) or during log-in. In addition to tokenizing the account ID, the user device 12, 16 may encrypt the account ID. The user device 12, 16 may encrypt the account ID with a biometric or knowledge-based password. The encrypted account ID may thus only be decrypted by the correct user in order to check account credentials. The encryption may provide an additional layer of security by ensuring that the correct user is interacting with the account.

The unique account ID may be used to associate or otherwise link a user device 12, 16 with the user account. An additional "certificate of approval" may be associated with or otherwise linked to an account. Such "certificates" may be associated with specific user devices 12, 16, such as a phone or card, on which a particular user accesses their account. As such, a user device 12, 16 that has not been approved by the system 10, e.g., by the server 14 cannot be used to login to a user's account. The foregoing may help prevent identity theft. This procedure may be supplemented in various ways to allow a user to add another user device 12, 16 to their account. In an embodiment, the foregoing procedure may be supplemented by sending a text, or email, which is stored in the user's account information, or by requesting additional authentication from an already approved user device 12, 16.

While multiple user devices 12, 16 may be used to log in to the same account, each user device 12, 16 may act as its own entity in the system 10 and have an associated "device ID" for unique identification of the respective device. This is because the user devices 12, 16 may not be able to update one another regarding their available funds in all cases and/or at all times and thus are treated as independent units even if held under the same name. As such, each newly registered user device 12, 16 receives from the system 10 a unique ID. The unique ID is stored in the database at the server 14. The unique ID is associated with the account ID (provided that the user has an account). User devices 12, 16 not connected or linked to an account in the system 10 may be assigned a certificate of approval and unique device ID. The certificate of approval and unique device ID may not be associated with any account. The device ID and certificate may be "shown" to the server 14 and/or the second user device 16 and approved during any transaction to ensure that the device is valid.

It may be possible to transfer funds from one user device 12, 16 to another user device 12, 16 owned or controlled by the same user while offline without concurrent transaction authentication on each device 12, 16.

An NFC tag may have an associated unique ID, or a signed "certificate of approval". An NFC tag may have a date of creation/approval. An NFC tag may have records or permissions of which funds the NFC tag may transfer. An NFC tag may store other permissions. An NFC tag may have records or permissions of which stores may utilize it. An NFC tag may have a (potentially salted) hash. This information may be checked by a user device 12, 16 which is communicating with the NFC tag. For example, the checking may occur by having the certificate and/or other data sent over.

Business accounts may be assigned an associated "business ID" and "business certificate". The business ID and/or business certificate may identify the business accounts as such.

The system 10 may implement any one or more of authentication protocols, strong passwords, the use of biometrics, and account and user device 12, 16 validation to help mitigate the risk of impersonation and/or mimicry.

In the case that a user device 12, 16 is stolen or lost, the server 14 may update the tokenization of the unique account ID (or the original unique account ID) on the remaining user devices 12, 16 or the account. In some cases, the stolen or lost user device 12, 16 may be flagged by the server 14 to disallow further transactions until the user of the flagged user device has verified that they have regained possession. Other user devices 12, 16 may be able to identify the flagged account as "blacklisted." The system 10 may host information regarding valid and invalid accounts in a central database at server 14. Checking the database central database may be incorporated into the transaction protocol.

The system 10 may be configured such that no data that can be directly linked to the user is stored on the SE at memory 304. This data may include, for example, biometrics, passwords, account IDs, etc. The system 10 may be configured to store in the SE only data that has been tokenized, encrypted, salted, or irreversibly transformed (cancelled). By doing so, damage caused by theft of the user device or SE breach may advantageously be limited, and a different cancellation, tokenization, or other encoding scheme may be used to redefine the data.

The system 10 may protect against the user device 12, 16 sending fake data. For example, prior to sending any transaction information from the user device 12, 16, the information may be checked for validity. The system 10 may be configured such that sensitive data is never be sent through NFC. This may, in effect, make any potential interception of transmitted data meaningless. The system 10 may be configured such that the user device 12, 16 sends a binary confirmation (instead of sensitive data).

Data transfer between a sending user device 12 and a receiving user device 16 may take place at a distance of up to 10 cm. The user device 12, 16 includes a hardware component including an RFID/NFC inlay 408 with antenna, as shown in FIG. 4. The RFID/NFC inlay 408 allows wireless communication (i.e., data transfer) between the first user device 12 in which the inlay 408 is included and the reader unit of a receiving user device 16, such as second user devices 16.

When the first user device 12 is brought into the electromagnetic field of the frequency of the reader 16, the chip 404 of the first/sending user device 12 is powered on. Once the chip 404 of the first user device 12 is on, the first user device 12 can wirelessly communicate with the reader 16 for data transfer. The communication between the sending user device 12 and the receiving user device 16 is secure as the reader unit/receiving user device 16 stores one or more secret keys for encrypting data in the first user device 12. A function of the secure element in secure cards is to embed secret keys at the time of manufacture into the card.

In an embodiment, the first user device 12 adheres to the ISO/IEC 14443 Standard for proximity integrated circuit cards (ICC). The second part of this standard, titled "Radio Frequency Power and Signal Interface", specifies that the first user device 12 operates at a frequency of 13.56 MHz and has an operational range of up to 10 centimeters or 3.94 inches. This means that the first user device 12 is within a 10-centimeter range of the reader unit of the receiving user device 16 for powering on and communication.

The physical characteristics of the hardware component adhere to the ISO/IEC 7810 ID-1 Standard. The ID-1 type is specified for payment cards as described in the present disclosure The RFID/NFC inlay 408 of the smartcard 400 further adheres to this standard. The ID-1 format specifies a size/dimensions of the smart card 400 of 85.60 by 53.98 millimeters (3⅜ in ×2⅛ in) and rounded corners with a radius of 2.88-3.48 mm (about 18 in). The smartcard 400 further ensures the initiation and receival of fund transfers only upon adequate authentication.

The secure element (SE) of the memory 304 may be an RFID/NFC-compatible integrated circuit which securely stores encrypted data. The encrypted data may include biometric information, account information, etc. When performed, biometric authentication (e.g., fingerprint authentication) is performed using the SE (meaning that the information used in the biometric authentication does not leave the card 400.

The SE may be ISO/IEC 7816 compliant for a contact card embodiment of smart card 400. The SE may be ISO/IEC 14443-compliant for a contactless card embodiment of the smart card 400. The secure element may be manufactured as an embedded component of the NFC when utilized in smart card applications.

Figure 5:
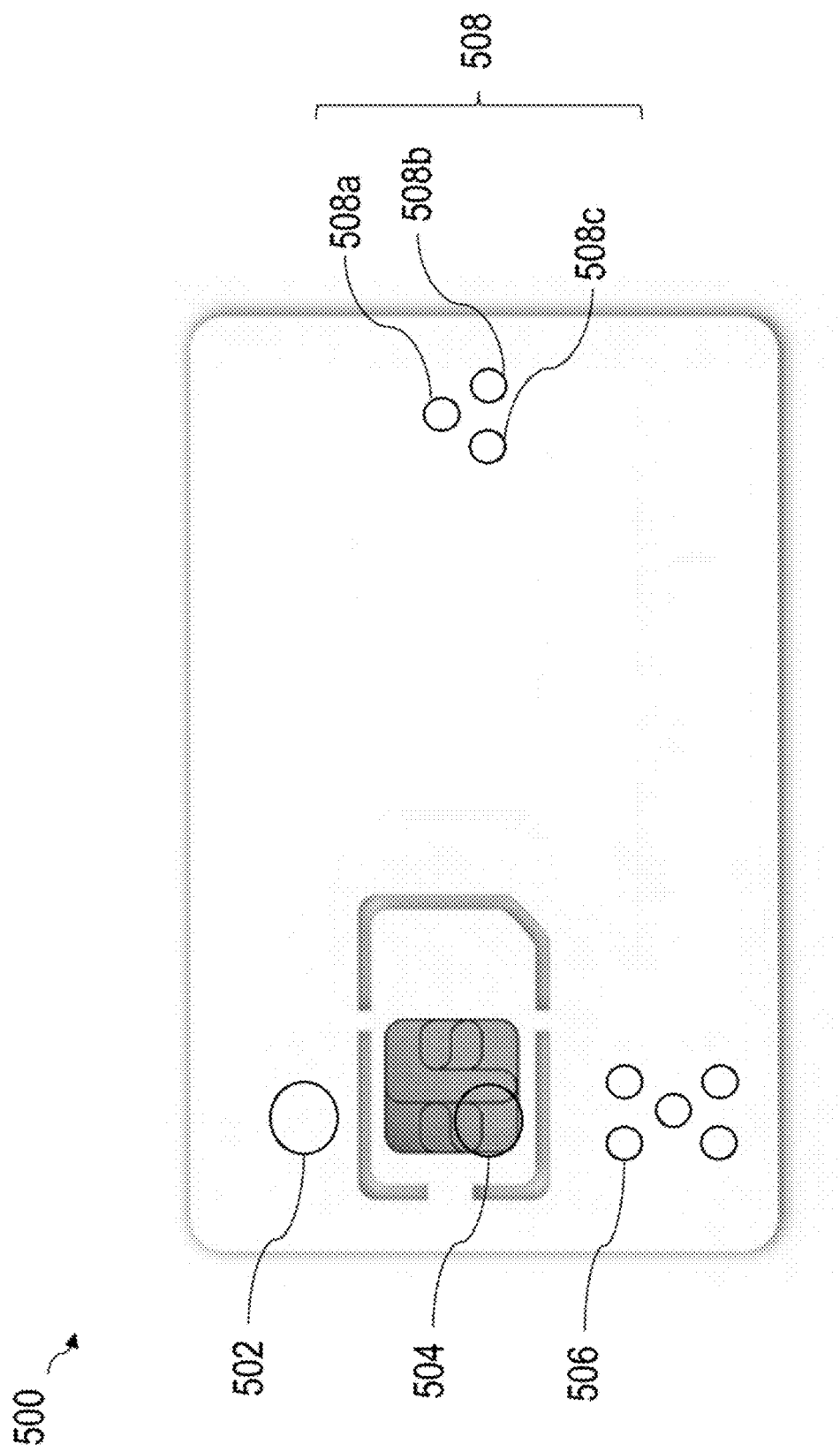
FIG. 5 is a top view of the smartcard user device of FIG. 4.

Turning now to FIG. 5, shown therein is a top view of a smartcard 500, according to an embodiment. The smartcard may be a user device 12 or 16 of FIG. 1.

The smartcard 500 includes a fingerprint scanner 502 for user authentication. The fingerprint scanner 502 is configured to perform biometric authentication of a fingerprint provided via the fingerprint scanner 502. The biometric authentication using the fingerprint scanner 502 may be used instead of a PIN-based authentication when using the card 500 (as well as a smartphone) for a payment operation. The biometric authentication provides authentication and security when making payments using the smart card 500. The biometric authentication is used instead of, for example, authentication by a central bank. The biometric authentication feature provided by the smart card 500 may advantageously facilitate compatibility with international markets. For example, according to European PSD2 Strong Customer Authentication (SCA) requirements, at least two of three things are used to verify a person during payment: something they are, something they have, and something they know. The use of the biometric authentication feature of the smart card 500 and the smart card 500 itself satisfies the first two requirements.

Biometric information is stored in the secure element at memory 304 of the smartcard 500 and encrypted as a template. Various encryption techniques may be used. In an embodiment, one or more cancellable biometric methods are used by the smart card 500. The biometric methods may include, for example, biohashing, noninvertible transformations, salting, and the like. The encryption may provide for irreversible distortion of biometric data. This may be beneficial in the event a malicious third party is able to access the biometric data. The biometric data is not transferred from the smart card 500. Authentication may be performed on the card 500 by the secure element and fingerprint scanner, with only binary information confirming or cancelling the transaction being sent through NFC to the payment device.

The fingerprint scanner 502 may be a highly accurate scanner in order to overcome the problem that biometric authentication in general may be "fuzzy" due to the variance between different scans from the same person. While this problem may be conventionally somewhat overcome through repeated scanning for a better template, the smartcard 502 advantageously includes the highly accurate scanner 502.

The systems, methods, and devices as described in the present disclosure may adhere to relevant standards exist for biometric authentication. Advantageously, the smartcard 500 may perform biometric authentication using the ISO/IEC 7816-11 standard. The ISO/IEC 7816-11 standard describes the commands, data structure, and data access methods relevant for biometric authentication with card payment. Advantageously, the smartcard 500 may perform biometric authentication using the ISO/IEC TR 30117 standard. The ISO/IEC TR 30117 standard provides a summary of international standards, recommendations, and technical reports, and provides additional recommendations, regarding biometrics in IC cards. Advantageously, the smartcard 500 may perform biometric authentication using the ISO/IEC 17839 standard. The ISO/IEC 17839 standard is a standard for the biometric system-on-a-card ID cards. The latter standard specifies physical characteristics, enrolment procedures and data structures, commands and security, and more. According to the 2015 version of this standard, minimum sensor size is 13×13 mm.

The memory 304 provides a means of securely storing data on the user device 12 or 16. This data can only be accessed by an operating system of the device 12 or 16 operating system by persons who are authenticated to do so. In an embodiment, the system 10 may store user data on the user device 12, 16 rather than in a central database, such as on server 14. Accordingly, the user has knowledge of and controls when their personal data can be accessed and by whom. This may advantageously further enhance privacy of the user's data in the system 10.

In FIG. 4, the actual hardware component that stores data on the smartcard 400 is the embedded chip 404. The embedded chip 404 may be a powerful minicomputer that can be programmed for different uses. The microchip 404 enables the smartcard 400 to access and store data securely from external devices (i.e., readers 16).

For security, the smartcard 400 provides mechanisms for authenticating those who want to gain access funds or user data (such as biometric information) stored thereon.

The smartcard 400 can be programmed to require multi-factor authentication.

The smartcard 400 can also protect data stored through encryption and other cryptographic methods enabled by the processor 302 of the smartcard 400. This includes key generation (at key generation module 388), secure key storage (at key data 352), hashing (at hashing modules 378), and digital signatures (at content signing module 332).

The smartcard 400 may be configured to adhere to the ISO/IEC 7816 Standard, specifically parts 4, 5, 6, 8, 9, 13, and 15. Part 4 of this Standard, titled "Organization, security and commands for interchange", details the means of retrieval of data elements (DEs) and data objects, access methods to files and data, security architecture defining access rights to files and data etc. Part 5, titled "Registration of application providers", specifies the procedure for granting the uniqueness of application identifiers through the international registration of a part of this identifier. Part 6, titled "Interindustry data elements for interchange", specifies the DEs used for interindustry interchange based on ICCs. Part 8, titled "Commands and mechanisms for security operations", specifies interindustry commands for ICCs that may be used for cryptographic operations. Part 9, titled "Commands for card management", specifies interindustry commands for ICCs for card and file management, e.g., file creation and deletion. Part 15, titled "Cryptographic information application", details storage, use, and retrieval of cryptographic information.

Accordingly, the smartcard 400 may be configured to retrieve data elements and data objects, access methods to files and data, and security architecture defining access rights to file and data.

Accordingly, the smartcard 400 may be configured to implement a procedure for granting the uniqueness of application identifiers through the international registration of a part of this identifier.

Accordingly, the smartcard 400 may be configured to use data elements for interindustry interchange based on ICCs.

Accordingly, the smartcard 400 may be configured to respond to interindustry commands for ICCs that may be used for cryptographic operations.

Accordingly, the smartcard 400 may be configured to respond to interindustry commands for ICCs for card and file management, e.g., file creation and deletion.

Accordingly, the smartcard 400 may be configured to provide for storage, use, and retrieval of cryptographic information.

The smartcard 400 securely stores funds (which may be represented as data) for transfer and to be accessible by RFID/NFC technology. The smartcard 400 is configured to update storage at transaction/fund transfer.

In some embodiments, the smartcard 400 may not include a power cell 244. In such cases, any power used for biometric authentication and NFC data transfer may be received through the same magnetic strip (not shown) that provides power at a point of sale (POS) device for standard smartcards not shown). However, if additional data input/output is added to the smartcard 400, power may be necessary. Power usage in general will depend on the chosen input/output methods. The power cell 244 may be a battery. The battery may be a flexible lithium polymer battery.

The smartcard 400 includes components that perform input/output functions, such as the auxiliary input/output (I/O) subsystem 224.

The auxiliary I/O subsystem and other input/output components may include buttons 508 that the user is able to press to select an option. The user may select a currency and a transfer amount upon initiating a transaction with the smartcard 400. The user may use up/down arrow buttons 508a and 508b that allow the user to select currency options and to increase/decrease the transfer amount. A third "OK" button 508c may be used to confirm selection.

As for the output component, the smartcard 500 may include an LED display 504 to display the information as selected by the user (currency, amount). The LED display 504 can also be used to show the user an amount of money remaining on the smartcard 500 at the beginning and end of a transaction. An additional component to output information is additional LEDs 506, which may light up to convey information about the status of the transaction. For example, if the transaction is successful, the additional LEDs 506 may light up green; if not successful, the additional LEDs 506 may light up yellow or red. The additional LEDs 506 may also display the battery level of the smart card.

The LED display 504 may conform to the ISO/IEC 7810 Standard for ID-1 cards. In an embodiment, the smartcard 500 may be designed to have a thickness that does not exceed 0.76 millimeters (1/32 in). The buttons 508 may also be designed to adhere to this standard. Such thickness limitation may advantageously provide for compliance with the ISO/IEC 7810 Standard for ID-1 cards.

The smartcard 500 includes a first plastic layer 402a, a second plastic layer 402b, and an inlay 408 disposed between the first and second plastic layers 402a and 402b.

The plastic layers 402a and 402b may form part of the smartcard 500 that allows all the different components to be integrated into one user device 12, 16. The plastic layers 402a and 402b are plastic card layers that contain the embedded microchip 404, buttons 508, LED display 504, RFID/NFC inlay 408, secure element at the memory 304, and power cell 244.

The smartcard 400 may be designed to conform to particulars outlined in the ISO/IEC 7810 Standard. Such particulars include physical characteristics, resistance to bending, chemicals, temperature, and humidity and toxicity. In an embodiment, the smartcard 400 may be designed with a size of 85.60 by 53.98 millimeters (3⅜ in ×2⅛ in) and rounded corners with a radius of 2.88-3.48 mm (about 18 in). Such dimensional limitations may advantageously provide for compliance with the ID-1 format.

The smartcard 400 may be designed to conform to ISO/IEC 7811 which details particulars for embossing and location of embossed characters on ID-1 cards. Embossment particulars apply if the smartcard 400 has the client's name, card number, and/or expiration date embossed thereon.

Integration of the systems and methods as described in the present disclosure into a phone application uses an NFC-compatible smartphone (not shown). Currently, approximately 75% of existing phones have this capability. No additional hardware may be required, as the secure element at the memory 304, NFC, power cell 244, and so on are already to be found on the existing smartphone. Integration into a phone application may include accessing the secure element at the memory 304/NFC in order to initiate a transaction and trigger authentication. This may be achieved through known coding techniques. The secure element of typical smartphones may already provide a security aspect.

The value stored and transferred across user devices 12, 16 may be store-specific loyalty points or other currency. Vendor users may choose to allow the store-specific points or currency of other stores to be transferred to store-specific points or currency of their own store. Optionally, the system 10 may incorporate a 'loss' or 'tax' on the user into the conversion, to further incentivize vendor participation in such conversion specifically and such store-specific loyalty points or currency programs generally.

A user may not have to purchase particular hardware, and lower fees may be charged per transaction than competitors. A user may further set limits on daily offline transactions.

The mobile application may follow a subscription model with different pricing for user and vendor accounts. Optionally following a free trial period, user accounts may require a monthly fee to be automatically paid from the offline funds of the user account. The user may be able to unsubscribe to end the service and stop paying the fee or 'pause' the account in order to avoid incurring the fee while the account is not in use. A subscription fee for vendors may be defined with reference to the fund limit on the accounts, with larger businesses attracting larger subscription fees.

The mobile application may follow a single fee model where a one-time app download fee is charged. Basic features of the app may then be used for free, while premium features may be able to be accessed upon paying further fees. For example, sending/receiving up to 5 payments per day may be a 'free' feature, while sending/receiving an unlimited number of payments per day may then be a 'premium' feature. Similarly, lower amounts may be allowed at 'free' vs. 'premium' app usage. Optionally, certain transactions may incur additional fees, e.g., transactions above a threshold amount.

The smart card device may charge a one-time fee for users.

The mobile application and smartcard 500 of the user device 12, 16 may follow a transaction fee revenue model. This fee may be for vendors rather than customers. Alternately, fees may be charged for transferring funds to and from customer bank accounts and for peer-to-peer transactions. Optionally, these fees may be lower than the initialization and activation fees previously described.

The system 10 may operate in partnership with vendors to create a loyalty points program. The program may allow users to add store points to their app or card 500 of the user device 12, 16 and convert between these points from one vendor to another. Consumers may also pay vendors with their points. The system 10 may charge vendors to integrate their points systems, existing or otherwise, into the system 10, for managing and maintaining the program in the system 10, and for conducting data analysis. Users may pay a fee to sign up for such partnership programs and/or for specific loyalty programs.

A "business fee" may be charged for vendors upon registering with the system 10. Registration as an official business may provide further benefits (e.g., data analysis, larger offline transactions, no cap on number of transactions, integrated loyalty program).

Figure 6:
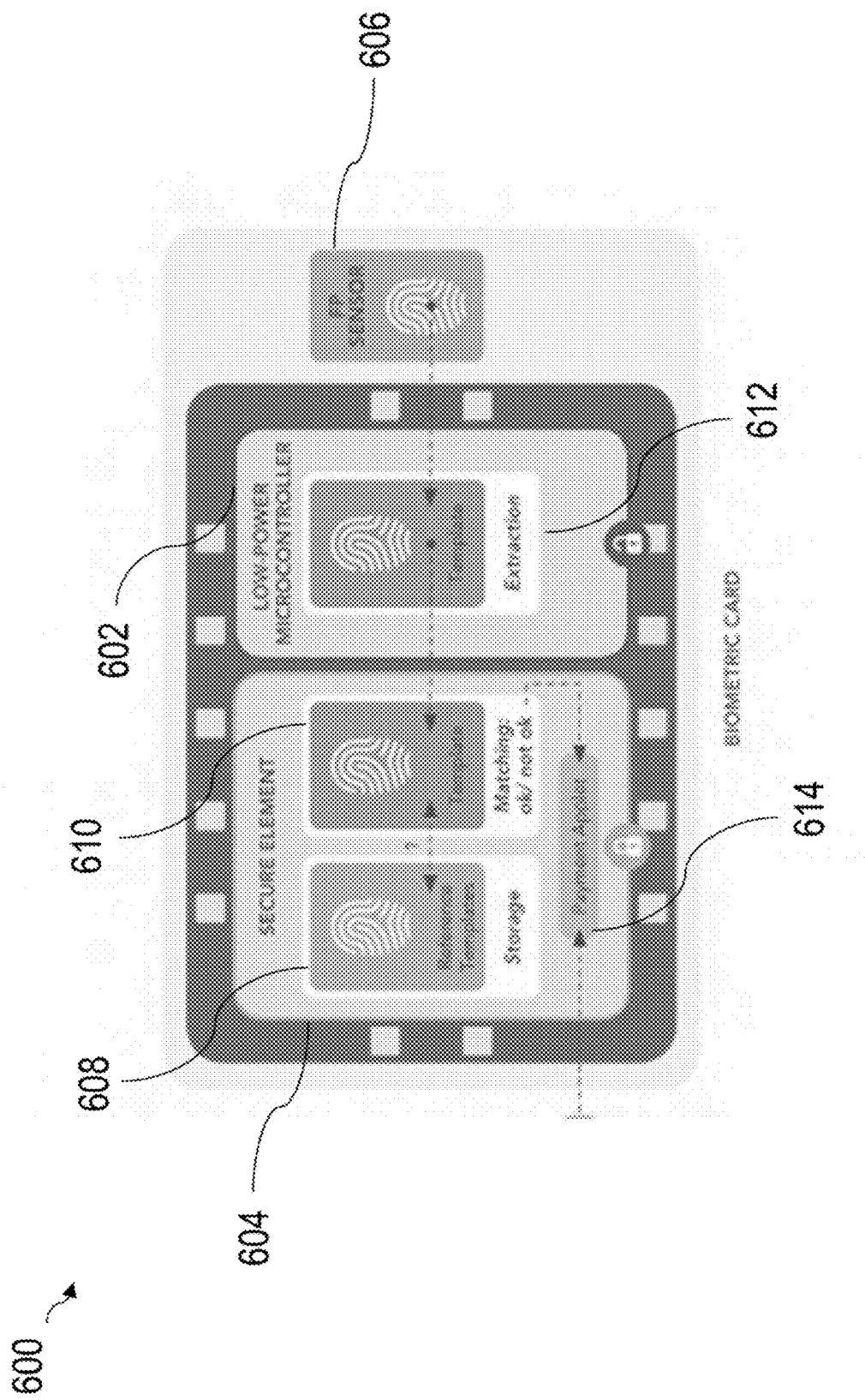
FIG. 6 is a top view of a smartcard user device of FIG. 4 with several components labelled.

Turning now to FIG. 6, shown therein is a top view of a smartcard user device 600, according to an embodiment.

The smartcard 600 contains a microcontroller 602 for controlling the operation of the smartcard 600.

The smartcard 600 further comprises a fingerprint sensor 606. The fingerprint sensor 606 captures and records a user's fingerprint at the time of authentication of a financial transaction performed using the smartcard 600.

The microcontroller 602 includes a fingerprint extraction unit 612. The fingerprint extraction unit 612 extracts biometric information from the fingerprint data received at the fingerprint sensor 606.

The smartcard 600 includes a secure element 604. The secure element 604 may be the secure element at memory 304 of FIG. 3. The secure element 604 is an RFID/NFC-compatible integrated circuit. The secure element 304 securely stores encrypted data, including biometric information, account information, etc. The secure element 604 is configured to perform fingerprint authentication of a user at the time of a financial transaction. Having the secure element 604 perform the authentication may advantageously obviate the need for the authenticating information to leave the smartcard 600, which may enhance security of the transaction data 313 and user biometric information.

The secure element 604 further comprises a reference templates storage unit 608. The reference templates storage unit 608 stores reference templates of a user's fingerprints. Such reference templates are used at a matching unit 610 to determine whether a person seeking to use the smartcard 600 in the financial transaction is the correct user of the smartcard 600. Matching at the matching unit 610 is performed using the reference templates stored at the reference templates storage unit 608 and the extracted biometric information extracted by the fingerprint extraction unit 612 extracted from the fingerprint data received at the fingerprint sensor 606. The matching unit 610 may generate a positive match signal or a negative match signal based on the success of the matching.

The smartcard 600 further comprises a payment applet 614. The payment applet 614 is configured to make a payment to a second user device 16, such as another smartcard 600, upon successful matching of a user's fingerprint at the matching unit 610. The payment applet 614 may initiate the payment upon receiving a positive match signal from the matching unit 610.

Figure 7:
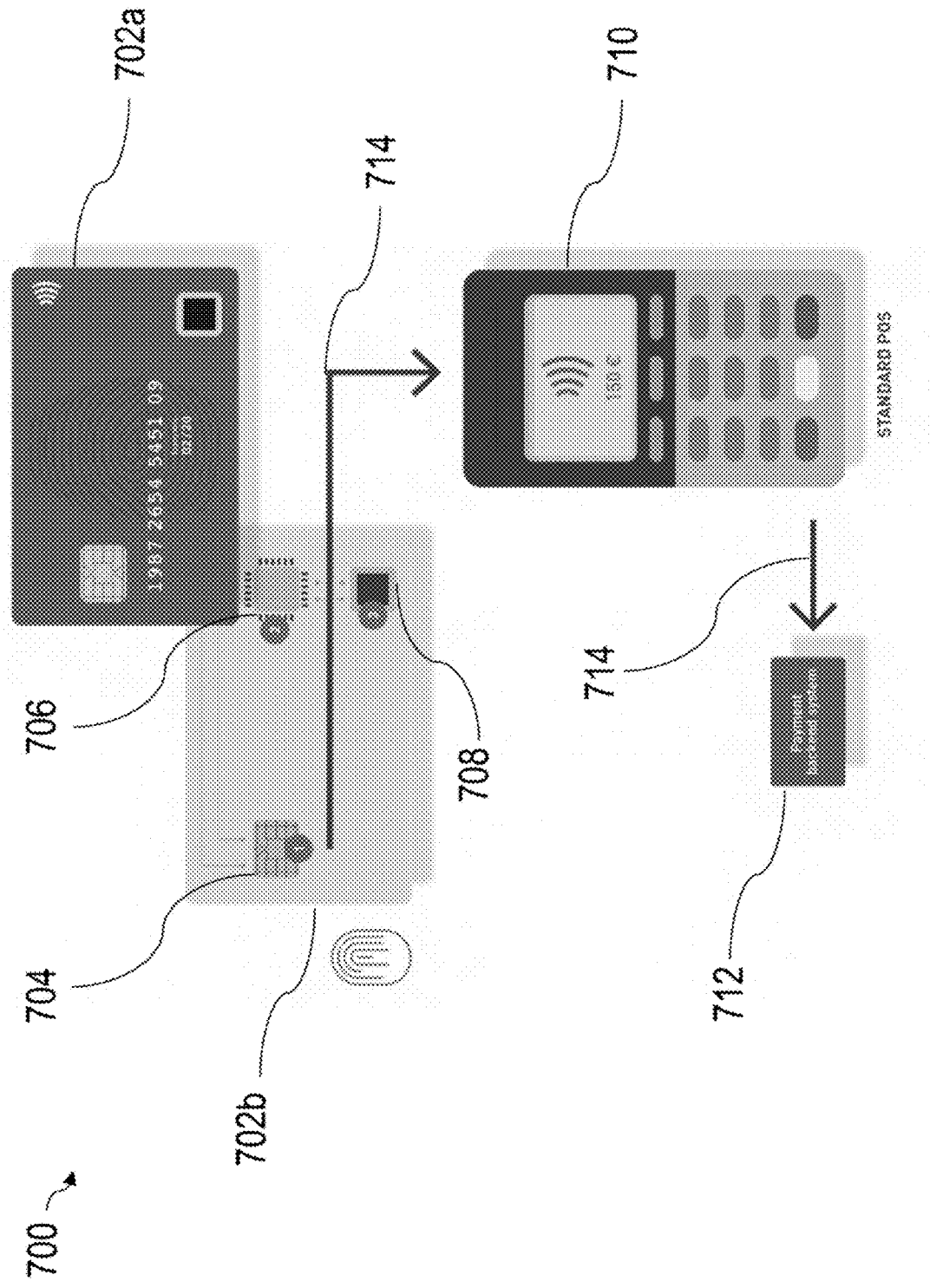
FIG. 7 is a schematic view of a digital value transfer system with a smartcard user device in exploded view, according to an embodiment.

Turning now to FIG. 7, shown therein is a value transfer system 700, according to an embodiment.

The value transfer system 700 includes a smartcard 702 and a POS terminal 710. The smartcard 702 is shown in an exploded view.

The smartcard 702 transfers value to the POS terminal 710 by making payment to the POS terminal 710. In an embodiment, the transfer of value may be effected by the smartcard 702 sending data and the POS 710 receiving that data.

The smartcard 702 has a frontside 702a and a backside 702b as shown. The smartcard 702 further includes a secure element 704, a microcontroller 706, and a fingerprint sensor 708.

The smartcard 702 also includes an applet stored on the smartcard 702 (not shown) for secure communication with the POS terminal 710. The applet communications with the POS terminal 710 via communication link 714. The applet may be stored in a separate area of the smartcard 702 other than the secure element 704.

The secure element 704 is disposed on the backside 702b of the smartcard 702. The secure element 704 stores the fingerprint template 608 on the smartcard 702 for biometric authentication of the user.

The fingerprint sensor 708 receives a user fingerprint at the time of the financial transaction.

The microcontroller 706 performs image capture, preprocessing, and feature extraction of the fingerprint received by the fingerprint sensor 708, thereby adhering to the relevant standards by not allowing the biometric data to leave the card.

Figure 8:
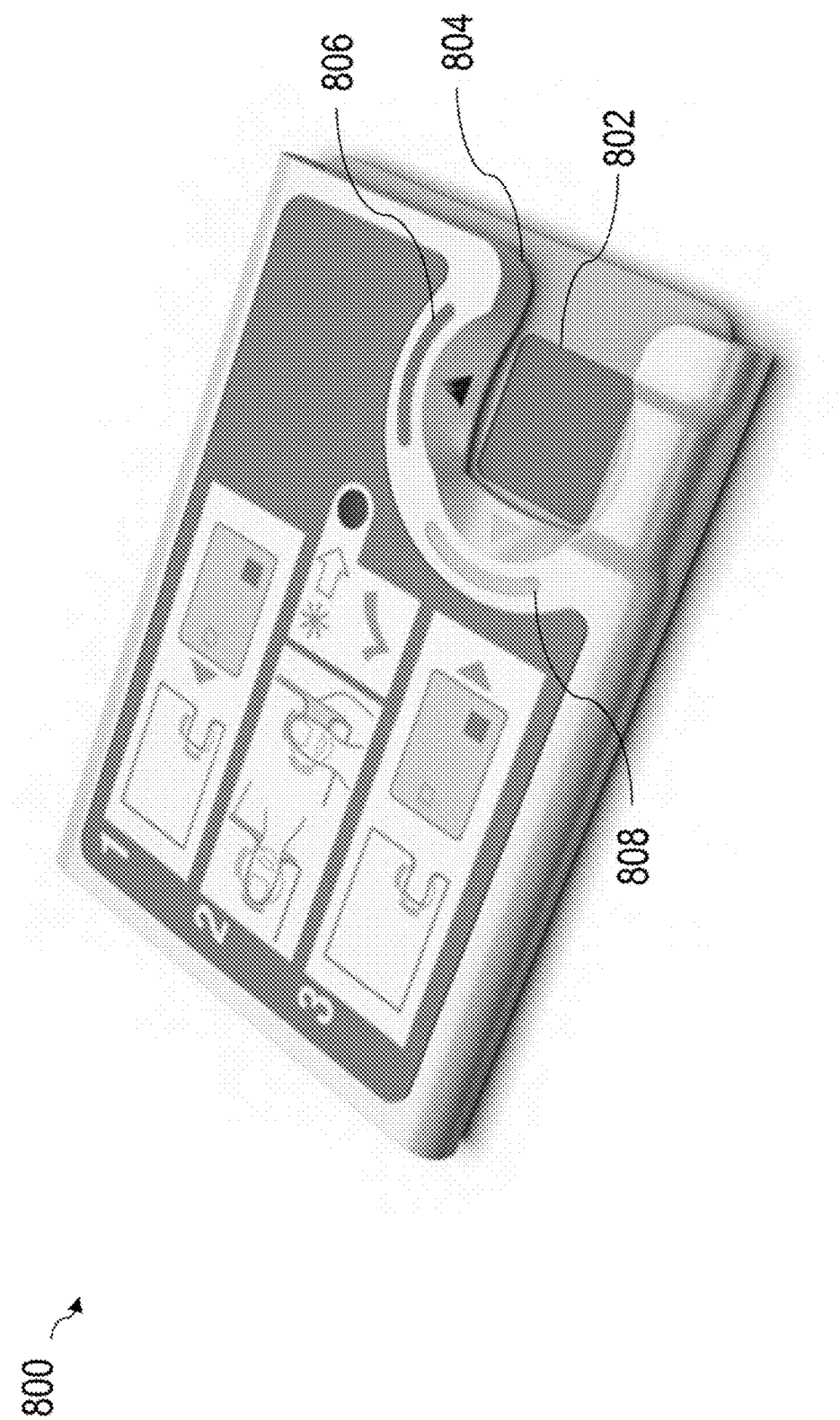
FIG. 8 is a top view of an enrolment device for recording biometric information of a user onto the smartcard of FIG. 7, according to an embodiment.

Turning now to FIG. 8, shown therein is a top view of an enrolment device 800 for recording biometric information of a user onto the smartcard 702, according to an embodiment.

The enrolment device 800 comprises a biometric reader 802 for receiving biometric information of a user to be recorded onto the smartcard 702. Such biometric information may be a user fingerprint. The biometric reader 802 may be a fingerprint reader.

The enrolment device 800 further comprises an aperture 804. The aperture is configured to receive the smartcard 702 to facilitate recording of a user's biometric information onto the smartcard 702.

The enrolment device 800 further comprises a first LED indicator 806. The first LED indicator 806 indicates failure of the enrolment device 800 to enroll the biometric information of a user onto the smartcard 702. Such failure may arise due to problems reading the user's biometric information at biometric reader 802.

The enrolment device 800 further comprises a second LED indicator 808. The second LED indicator 808 indicates success of the enrolment device 800 in enrolling the biometric information of a user onto the smartcard 702.

In an embodiment, the LED indicators 806 and 808 may be the same LED indicator, which can indicate either success or failure of the enrolment device 800 as appropriate.

Figure 9:
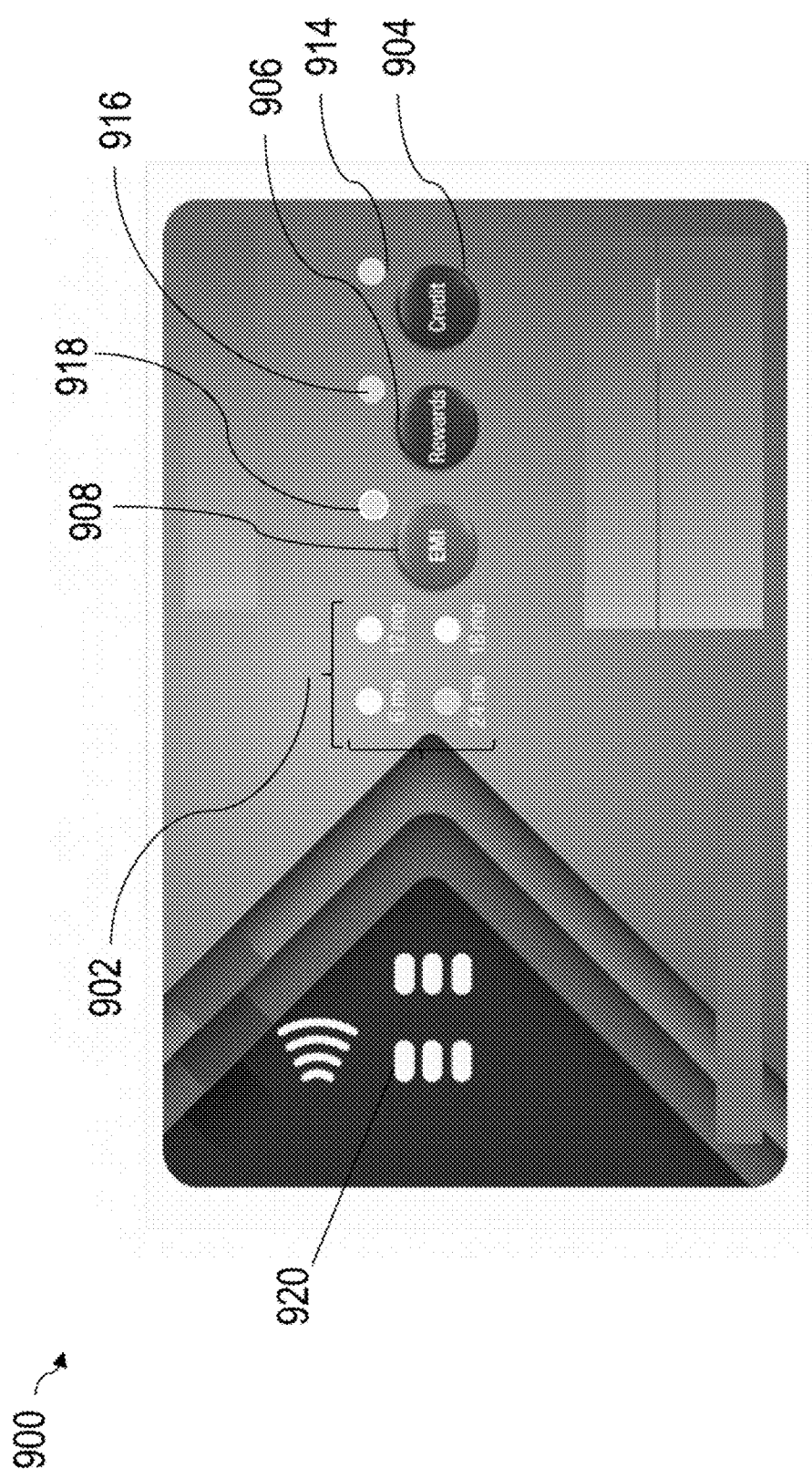
FIG. 9 is a top view of a smartcard of FIG. 7, according to an embodiment.

Turning now to FIG. 9, shown therein is a top view of a smartcard user device 900, according to an embodiment.

The smartcard user device 900 includes validity indicators 902 for showing the length of time during which the smartcard 900 will remain valid. For example, in FIG. 9, the lifetime of smartcard 900 is indicated as approximately 24 months.

The smartcard 900 further includes credit button 904 and associated credit indicator 914. The credit button 904 allows a user to select to purchase goods using a credit method of payment. The associated credit indicator 914 provides visual confirmation to the user that this method of payment has been selected.

The smartcard 900 further includes rewards points button 906 and associated rewards points indicator 916. The rewards points button 906 allows a user to select to purchase goods using a rewards points method of payment. The associated rewards points indicator 914 provides visual confirmation to the user that this method of payment has been selected.

The smartcard 900 further includes an equated monthly installments (EMI) button 908 and associated EMI indicator 918. The EMI button 908 allows a user to select to purchase goods using a credit method of payment. The associated EMI indicator 918 provides visual confirmation to the user that this method of payment has been selected.

The smartcard 900 further includes contact points 920 for effecting contact between the smartcard 900 and another device to conduct transactions.

Figure 10:
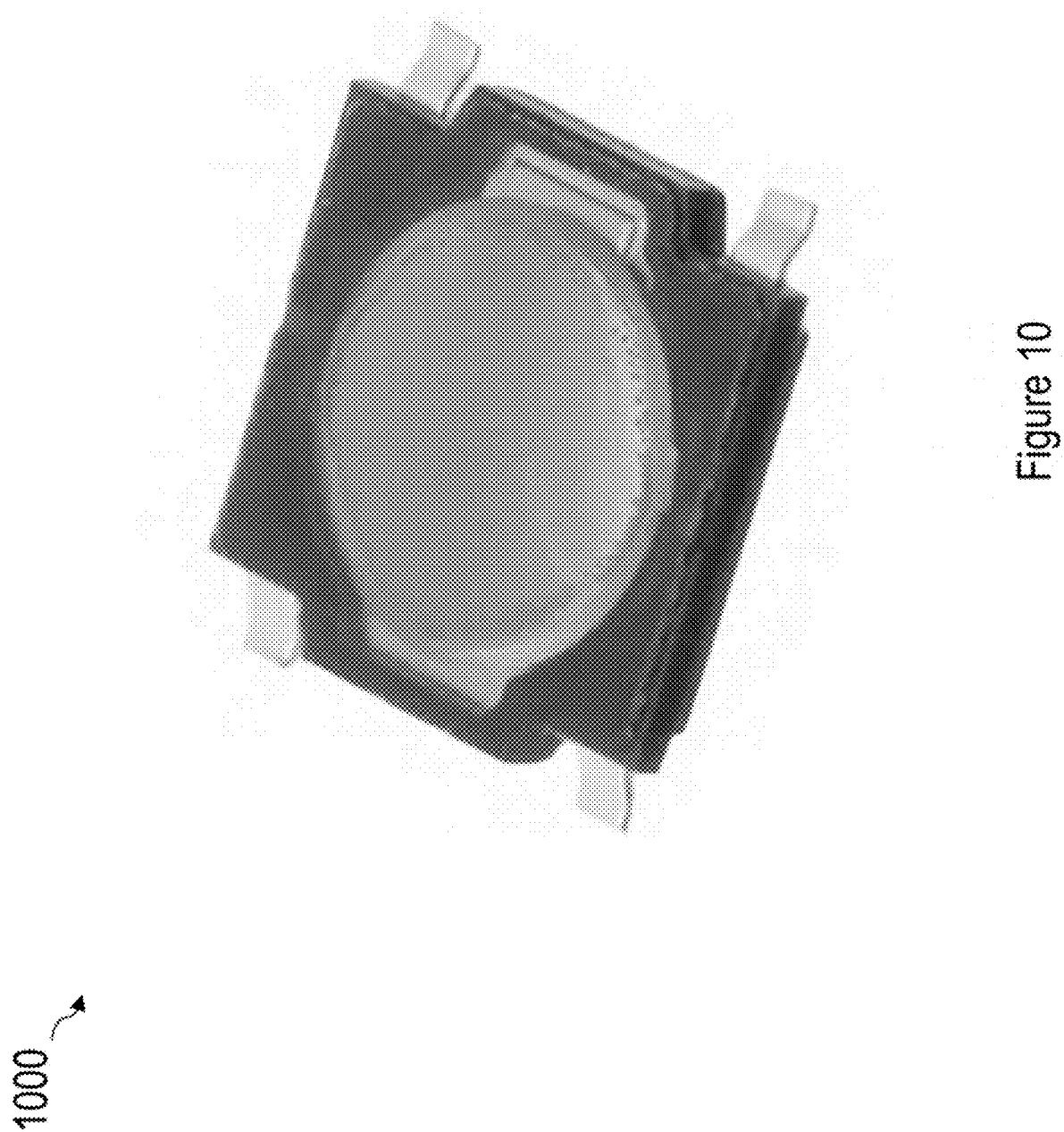
FIG. 10 is a top view of a button for installation on the smartcard of FIG. 7, according to an embodiment.

Turning now to FIG. 10, shown therein is a top view of a button 1000 for installation on a smartcard user device, according to an embodiment. The button 1000 may be installed on any of smartcard 400, 500, 600, 702, and 900. For example, the button 1000 may be a credit button 904, a rewards points button 906, or an EMI button 908 on smartcard 900 as shown in FIG. 9.

Figure 11:
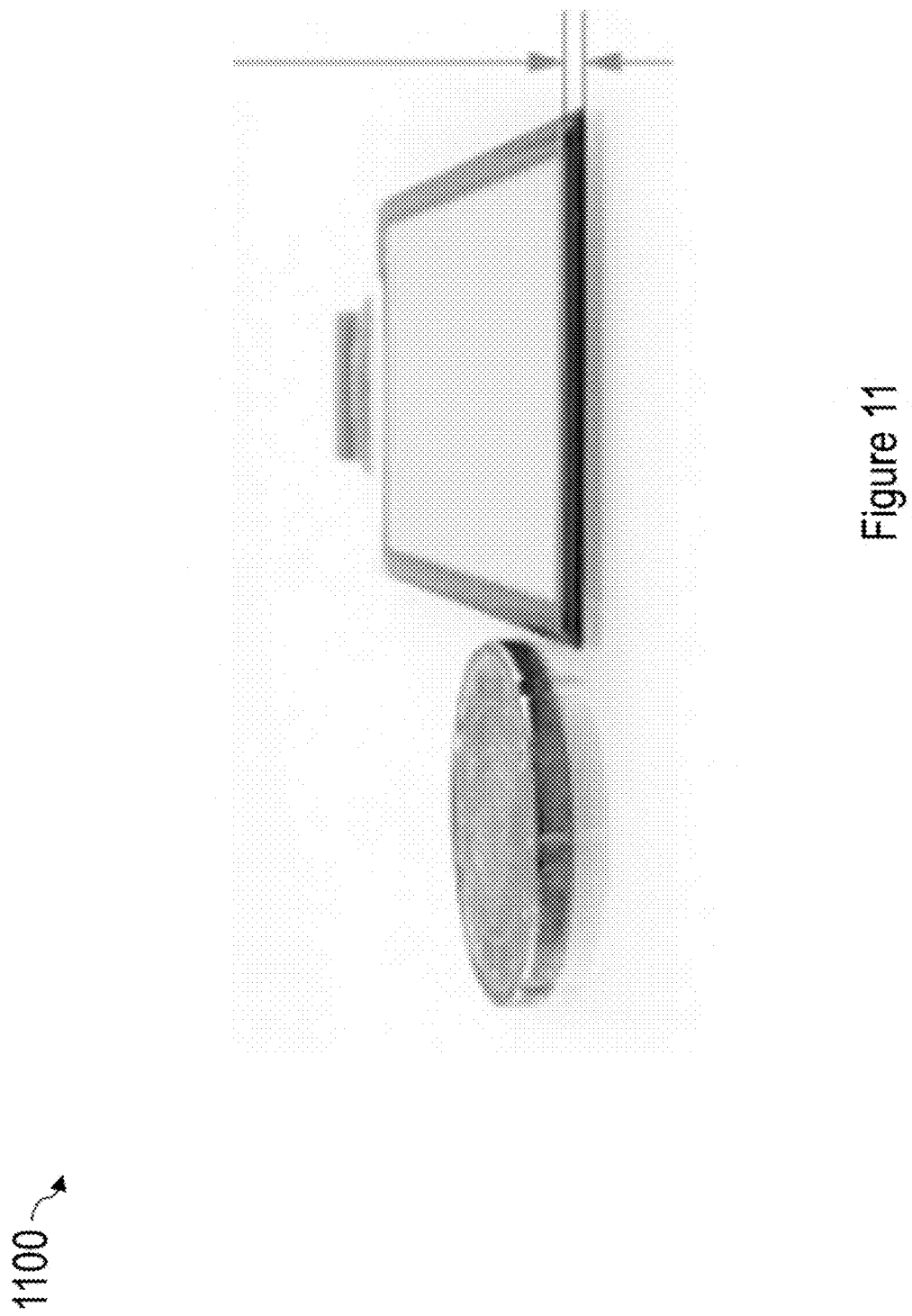
FIG. 11 is a side view of a display for installation on the smartcard of FIG. 7, according to an embodiment.

Turning now to FIG. 11, shown therein is a side view of a display 1100 for installation on a smart card user device, according to an embodiment. The display may be installed, for example, on any of smartcard 400, 500, 600, 702, and 900.

Figures 12A, 12B:
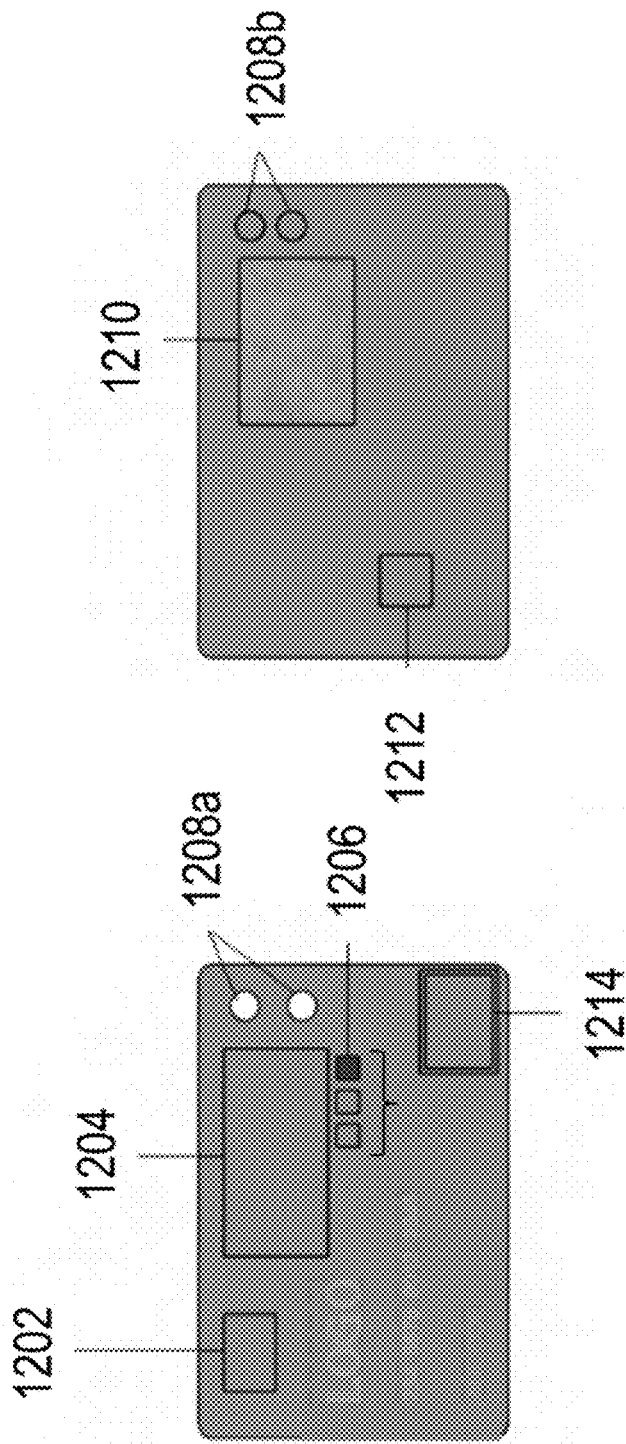
FIGS. 12A and 12B are top and bottom views, respectively, of a smartcard of FIG. 7, according to an embodiment.

Turning now to FIGS. 12A and 12B, shown therein are top and bottom views, respectively, of a smartcard 1200, according to an embodiment.

The smartcard 1200 includes a chip 1202 containing processor 302 and memory 304. The memory 304 includes a secure element (such as previously described herein).

The smartcard 1200 further comprises a data display 1204 for displaying information and feedback to the user.

The smartcard 1200 further comprises buttons 1206. The buttons 1206 may have various functionalities, such as 'up' and 'down' for increasing and decreasing, respectively, the amount of money a user will pay in a financial transaction, and 'ok' to approve the financial transaction.

The data display 1204 may display the transfer amount selected by the user. The buttons 1206 may be used to change the transfer amount, for example by pushing 'up' to increase the transfer amount and by pushing 'down' to lower the transfer amount. The buttons 1206 may further be used to approve a transfer amount displayed on the data display 1204.

The smartcard 1200 further comprises LED holes 1208*a* for insertion of LEDs 1208*b* to indicate success or failure of a transaction.

The smartcard 1200 further comprises a battery 1210 for powering the smartcard.

The smartcard 1200 further comprises an NFC unit 1212. The NFC unit 1212 facilitates exchange of information between the smart card 1200 and other devices such as readers 16 and other payment devices at the time of the financial transaction.

The smartcard 1200 further comprises a fingerprint sensor 1214 for reading a user's fingerprint. The user's fingerprint may be provided to the smart card 1200 via the fingerprint sensor 1214 at the time of the financial transaction.

Turning now to FIG. 13, shown therein is a flowchart of a method 1300 for preparing a transfer of value between first and second user devices, according to an embodiment. The method 1300 may be performed by the system 10 of FIG. 1.

At 1302, a first user device 12 initiates a request for transferring funds to a second user device 16 in a financial transaction. The first user device 12 may be a receiving user device or a sending user device in method 1300.

At 1304, a first user is authenticated at the first user device 12. This may include confirming the first user as being the proper owner of the first user device 12. At 1306, a funds balance on the first user device 12 is checked.

If the first user device 12 is behaving as a sending user device in the financial transaction, the first user device 12 checks the fund balance of the first user on the first user device 12 to ensure sufficient funds are available to complete the transfer. Sufficiency of funds is determined according to a transfer amount, which forms part of transaction details of the financial transaction.

If the first user device 12 is behaving as a receiving user device in the financial transaction, the balance of funds on the first user device 12 is checked to ensure that receipt of the transfer amount of funds will not cause the funds balance on the first user device 12 to exceed a maximum amount of funds.

At 1308, NFC is opened between the first user device 12 and the second user device 16.

At 1310, the transaction data 313 describing details of the transaction is encrypted at the first user device 12 and the encrypted transaction data is sent to the second user device 16 via the NFC.

At 1312, the encrypted transaction data is received from the first user device 12 and decrypted at the second user device 16.

At 1314, the second user is authenticated at the second user device 16. This may include authenticating the second user as being the proper owner of the second user device 16.

At 1316, a funds balance on the second user device 16 is checked.

If the second user device 16 is behaving as a sending user device in the financial transaction, the funds balance on the second user device 16 is checked to ensure sufficient funds are available to complete the transfer. Sufficiency of funds is determined with reference to a transfer amount. The transfer amount is included within the transaction data 313 of the financial transaction.

If the second user device 16 is behaving as a receiving user device in the financial transaction, the funds balance on the second user device 16 is checked to ensure that receipt of the transfer amount of funds will not cause the balance of funds on the second user device 16 to exceed a maximum amount of funds.

At 1318, an NFC message is sent from the second user device 16 to the first user device 12 approving the financial transaction.

At 1320, the user of the first user device 12 and the user of the second user device 16 are prompted to issue a final user approval of the financial transaction before the financial transaction is processed. The final user approval is provided by the respective users to their respective user devices 12, 16 via a user interface (not shown) of the respective device 12, 16.

Turning now to FIG. 14, shown therein is a flowchart of a method 1400 for transferring value between sending and receiving user devices in a financial transaction, according to an embodiment. The method 1400 may be performed by the system 10 of FIG. 1. Functions performed by the devices 12, 16 may be performed using software components executing on the sending and receiving user devices 12 and 16, respectively, such as the transaction engine 309. A sending user funds balance is stored on the sending user device 12. A receiving user funds balance is stored on the receiving user device 16.

At 1402, a transfer amount of funds to be transferred from a sending user device (such as first user device 12) to a receiving user device (such as second user device 16) is frozen at the sending user device. Funds frozen in this manner are still stored on the sending user device but cannot be transferred off the sending user device. For example, frozen funds may not be transferred either to another user device (such as first user device 12 or second user device 16), or to a user's own bank account. If the transaction fails, frozen funds are unfrozen on the sending user device.

At 1404, frozen funds are created at the receiving user device. As described previously, such frozen funds are placed in an unusable state on the receiving user device. The unusable state means the frozen funds cannot be used by the user until unfrozen.

At 1406, the receiving user device notifies the sending user device of receipt of the funds transferred in the financial transaction. More specifically, the receiving user device notifies the sending user device that an amount of funds equal to the transfer amount have been created and frozen at the receiving user device.

At 1408, the frozen funds at the sending user device are removed from the sending user funds balance at the sending user device.

At 1410, the sending user device notifies the receiving user device that the frozen funds have been removed from the sending user funds balance on the sending user device.

At 1412, the newly created frozen funds at the receiving user device are unfrozen. Unfreezing the frozen funds puts the funds into a usable state. In the usable state, the user of the receiving user device (such as first user device 12 or second user device 16) may freely use or otherwise transfer the received and unfrozen funds.

In an embodiment, the user devices (such as first user device 12 or second user device 16) are queueable. There may exist one user device that is the authoritative device where value is stored, which allows offline transactions without an online connection. Other user devices (i.e., non-authoritative user devices) may only queue the authoritative user device for a transaction if the authoritative device is online.

Figure 15:
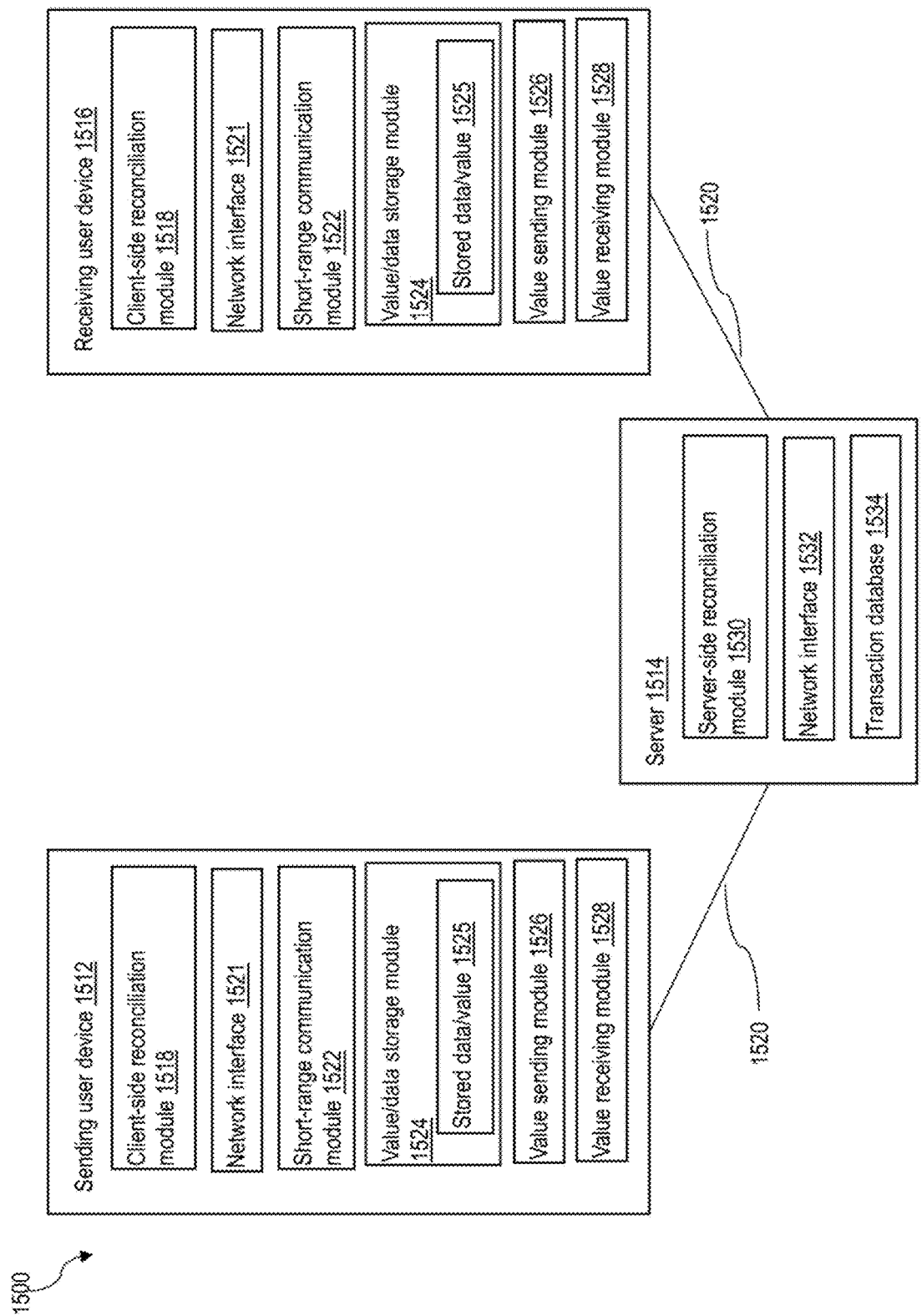
FIG. 15 is a block diagram of devices in a digital value transfer system with offline functionality, according to an embodiment.

Referring now to FIG. 15, shown therein is a block diagram of devices in a digital value transfer system 1500 with offline functionality, according to an embodiment.

The digital value transfer system 1500 includes a sending user device 1512 for sending value to a receiving user device 1516 and a server 1514 for reconciling transactions that take place offline.

The sending user device 1512 and the receiving user device 1516 include client-side reconciliation modules 1518 for reconciling digital value sent from the sending user device 1512 to the receiving user device 1516.

The sending user device 1512 and the receiving user device 1516 include network interfaces 1521 for interfacing with the network 1520 through which the user devices 1512, 1516 communicate with a server 1514 when online.

The user devices 1512, 1516 include short-range communication modules 1522 for effecting communication with each other when offline. Using the short-range communication modules 1522, the user devices 1512, 1516 may effect transactions (e.g., the sending user device 1512 transfers digital value to the receiving user device 1516) while the devices 1512, 1516 are offline with respect to the network 1520 and the server 1514. In an aspect, the short-range communication modules 1522 may use Near-Field Communication (NFC).

The user devices 1512, 1516 further include vault/data storage modules 1524 for storing digital value (such as a user funds balance) and/or data (such as data concerning a user funds balance). The vault/data storage modules 1524 include stored data/value 1525.

The user devices 1512, 1516 further include value sending modules 1526 for sending digital value/data to another user device.

The user devices 1512, 1516 further include value receiving modules 1528 for receiving digital value/data from another user device.

Although the system 1500 is described such that the sending user device 1512 sends value to the receiving user device 1516, it will be understood that either of the devices 1512, 1516 may be sending or receiving user devices with respect to each other or other user devices.

In an embodiment, the sending user device 1512 may not include the value receiving module 1528.

In an embodiment, the receiving user device 1516 may not include the value sending module 1526.

In an embodiment, the user devices 1512, 1516 may transfer digital value (e.g., user funds) directly.

In an embodiment, the user devices 1512, 1516 may not transfer digital value (e.g., user funds) directly. The sending user device 1512 may send data to the receiving user device 1516 instructing the receiving user device 1516 to create new data representing digital value in the value/data storage module 1524 of the receiving user device 1516. Similarly, the sending user device 1512 may erase, delete, freeze, or otherwise render inaccessible, temporarily or permanently, data representing digital value in the stored data/value 1525 of the value/data storage module 1524 of the sending user device 1512. Accordingly, no digital value may be transferred between the user devices 1512, 1516.

The system 1500 further includes the server 1514 for reconciling and recording transactions.

The server 1514 communications with the user devices 1512, 1516 through the network 1520.

The server 1514 includes a server-side reconciliation module 1530 for reconciling transactions of transferring digital value/data between the user devices 1512, 1516. In an embodiment, the server 1514 may only reconcile transactions that take place while the user devices 1512, 1516 are online. In an embodiment, the server 1514 may effect reconciliation of transactions that take place while the user devices 1512, 1516 are offline. Such reconciliation of offline transactions may take place once one or both of the user devices 1512, 1516 regain online connectivity with the server 1514 through the network 1520. Where one user device 1512 or 1516 regains online connectivity before the other, the server 1514 may begin to effect reconciliation of the transaction at the server-side reconciliation module 1530, but reconciliation may not be completed until the other user device 1512 or 1516 has regained online connectivity.

The server 1514 further includes a network interface 1532 for interfacing with the network 1520 and communicating with the user devices 1512, 1516.

The server 1514 further includes a transaction database 1534 for recording details of the transactions and transfers of the user devices 1512, 1516.

In an embodiment, one or more users of the system 1500 may have user accounts across one or more user devices 1512, 1516. Details on the user accounts may be stored at the user devices 1512, 1516 (e.g., in the value/data storage modules 1524) and/or at the server 1514 (e.g., in the transaction database 1534).

In an embodiment, the value sending module 1526 of the sending user device 1512 may freeze digital value and/or data associated with the digital value in the stored data/value 1525 of the sending user device 1512. The frozen digital value and/or data may only be unfrozen upon reconciliation of the transaction at the server-side reconciliation module 1530.

In an embodiment, either the value sending module 1526 or the value receiving module 1528 may generate or begin a transaction.

In an embodiment, only the value sending module 1526 may generate or begin a transaction through attempting to send digital value/data.

In an embodiment, only the value receiving module 1528 may generate or begin a transaction through requesting to receive digital value/data.

In an embodiment, the user devices 12, 16 are each associated with more than one user account. Such association may be on a permanent basis (e.g., more than one account is registered to the user device 12). Such association may be on a non-permanent basis (e.g., multiple individual users log on and off the user device 12). Different device resources (e.g., software resources) may be available to the different users of the user devices 12, 16.

What is claimed is the systems and methods as generally and specifically described herein.

The invention claimed is:

1. A system for transferring value across user devices, the system comprising:
at least one sending user device, wherein the sending user device is configured to store monetary value;
at least one receiving user device, wherein the receiving user device is configured to receive a transfer amount of value sent by the sending user device;
a transfer server, wherein, when the sending user device stores value greater than or equal to the transfer amount of value, the transfer server freezes at the sending user device an amount of value greater than or equal to the transfer amount of value;
wherein the sending user device is configured to transfer the transfer amount of value to the receiving user device upon receiving confirmation to transfer the transfer amount of value and acceptance by the receiving user device of the transfer;
wherein the transfer takes place only when the sending user device and receiving user device are in close physical proximity at a first distance at the time of or shortly after the transfer request; and
wherein the value stored on the user devices is stored locally and does not reside on the transfer server, and wherein the sending user device and the receiving user device are configured to perform one or more transfers while one or both devices is temporarily without Internet connectivity.

2. The system of claim 1 further comprising at least one of a sending user account with which the sending user device is associated and a receiving user account with which the receiving user device is associated, the sending user account and the receiving user account further being recognized by the transfer server.

3. The system of claim 2, wherein multiple user devices are associated with a single user account where the multiple user devices are used by a user of the single user account, and wherein no user device is associated with multiple user accounts.

4. The system of claim 1, wherein the one or more transfers between the sending user device and the receiving user device that take place while one or both devices is temporarily without Internet connectivity are reconciled once the sending user device and/or the receiving user device regains Internet connectivity.

5. The system of claim 1, wherein the value stored on the user devices comprises points purchased at parity with local currency, and wherein the value stored on the user devices is exchangeable for local currency at a later time.

6. The system of claim 1, wherein the system prevents double-spending of value through:
a secure, encrypted message and a hash thereof paired with the value in the user account;
information on a location of the user device, the last transfer in which the user device participated, and the user of the user device, the information being used to validate the one or more transfers; and
a protocol specifying what actions may or may not be performed once a transfer between the sending user device and the receiving user device has been initiated.

7. The system of claim 6, wherein the protocol comprises that value sent by the sending user device to the receiving user device cannot be cancelled.

8. The system of claim 1, wherein the sending user device or the receiving user device further comprises a biometric identification module, wherein value is not sent from the sending user device or received at the receiving user device, respectively, until biometric identification information provided by the user at the time of the transfer matches biometric identification information provided by the same user at the time the sending user device or the receiving user device, respectively, is configured.

9. The system of claim 8, wherein the biometric identification information of the biometric identification module is encrypted and entirely local to the user device, and wherein the user device discloses no information concerning biometric identification other than success or failure of the biometric identification.

10. The system of claim 1, wherein value stored on a lost user device is not recoverable.

11. The system of claim 1, wherein the first distance is 10 cm or less.

12. The system of claim 1, wherein the transfer server unfreezes any frozen value greater than the transfer amount of value after a transfer of the transfer amount of value has taken place from the sending user device to the receiving user device.

13. A method for transferring value across user devices, the method comprising:
   determining that a sending user device stores an amount of value greater than or equal to a transfer amount of value corresponding to a transfer;
   freezing through a transfer server at the sending user device storing value the amount of value greater than or equal to the transfer amount of value corresponding to the transfer;
   transferring value from the sending user device storing value to a receiving user device, wherein the receiving user device is configured to receive the transfer amount of value sent by the sending user device, and wherein the transfer occurs only if the sending user device and the receiving user device are in close physical proximity at a first distance at the time of or shortly after the transfer request,
   wherein the value stored on the user devices is stored locally and does not reside on the transfer server, and wherein the sending user device and the receiving user device are configured to perform one or more transfers while one or both devices is temporarily without Internet connectivity.

14. The method of claim 13 further comprising storing value on at least the sending user device and reconciling the one or more transfers between the sending user device and the receiving user device that take place while one or both devices are temporarily without Internet connectivity once the sending user device or receiving user device regains Internet connectivity.

15. The method of claim 13, the method further comprising preventing double-spending of value, preventing double-spending of value comprising:
   pairing a secure, encrypted message and a hash thereof with the value in the user account;
   using information on a location of the user device, the last transfer in which the user device participated, and the user of the user device to validate the one or more transfers;
   specifying in advance what actions may and may not be performed once a transfer between the sending user device and the receiving user device has been initiated.

16. The method of claim 13 further comprising using a biometric identification module, wherein the sending user device further comprises the biometric identification module, wherein transferring value from the sending user device does not proceed until biometric identification information provided by the user at the time of the transfer matches biometric identification information provided by the same user at the time the sending user device is configured.

17. The method of claim 13, wherein using a biometric identification module occurs entirely locally to the user device and further comprises disclosing no information concerning biometric identification other than success or failure of the biometric identification.

18. A sending user device for transferring value in a transaction, the sending user device comprising:
   a memory comprising a secure element configured to store monetary value;
   a processor comprising a cryptography engine, a transaction engine, and a key generation module, wherein the cryptography engine is configured to encrypt and sign and to verify and decrypt digital signatures of a transaction, the transaction engine is configured to implement security features of the sending user device and generate transactions, and the key generation module is configured to generate public keys and private keys;
   wherein, when the transaction is verified and the sending user device stores value greater than or equal to a transfer amount of value, an amount of value greater than or equal to the transfer amount of value is frozen in the secure element;
   wherein any frozen value greater than the transfer amount of value is unfrozen in the secure element upon the conclusion of the transaction after a transfer of the transfer amount of value has taken place from the sending user device to a receiving user device;
   wherein the sending user device is configured to transfer the transfer amount of value to the receiving user device upon receiving confirmation to transfer the transfer amount of value and acceptance by the receiving user device of the transfer;
   wherein the transfer takes place only if the sending user device and the receiving user device are in close physical proximity at a first distance at the time of or shortly after the transfer request; and
   wherein the value stored on the sending user device is stored locally and does not reside on the transfer server, and wherein the sending user device is configured to perform one or more transfers while the sending user device is temporarily without Internet connectivity.

19. A receiving user device for transferring value in a transaction, the receiving user device comprising:
   a memory comprising a secure element configured to store monetary value;
   a processor comprising a cryptography engine, a transaction engine, and a key generation module, wherein the cryptography engine is configured to encrypt and sign and to verify and decrypt digital signatures of a transaction, the transaction engine is configured to implement security features of the receiving user device and generate transactions, and the key generation module is configured to generate public keys and private keys;
   wherein a sending user device is configured to transfer the transfer amount of value to the receiving user device upon receiving confirmation to transfer the transfer amount of value and acceptance by the receiving user device of the transfer;
   wherein the transfer takes place only if the sending user device and the receiving user device are in close physical proximity at a first distance at the time of or shortly after the transfer request; and
   wherein the value stored on the receiving user device is stored locally and does not reside on the transfer server, and wherein the receiving user device is configured to perform one or more transfers while the receiving user device is temporarily without Internet connectivity.

20. A server for transferring value across user devices, the server comprising:
   a memory comprising a secure element configured to store records of transactions transferring value across user devices;
   a processor comprising a cryptography engine, a transaction engine, and a key generation module, wherein the cryptography engine is configured to encrypt and sign and to verify and decrypt digital signatures of a transaction, the transaction engine is configured to implement security features of the and generate transactions, and the key generation module is configured to generate public keys and private keys;

wherein, when the transaction is verified and a sending user device stores value greater than or equal to a transfer amount of value, the transfer server freezes an amount of value greater than or equal to the transfer amount of value;

wherein the transfer of the transfer amount of value to the receiving user device occurs upon receiving confirmation to transfer the transfer amount of value and acceptance by the receiving user device of the transfer;

wherein the transfer takes place only if the sending user device and the receiving user device are in close physical proximity at a first distance at the time of or shortly after the transfer request; and wherein the value stored on the user devices is stored locally and does not reside on the server, and wherein the sending user device and the receiving user device are configured to perform one or more transfers while one or both devices is temporarily without Internet connectivity.

* * * * *